(12) United States Patent
Chen et al.

(10) Patent No.: US 11,868,459 B2
(45) Date of Patent: Jan. 9, 2024

(54) OPERATION METHOD WITH FINGERPRINT RECOGNITION, APPARATUS, AND MOBILE TERMINAL

(71) Applicant: GODO KAISHA IP BRIDGE 1, Tokyo (JP)

(72) Inventors: Jianjun Chen, Lund (SE); Fredrik Rusek, Lund (SE); Hongjun Wang, Shenzhen (CN)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

(21) Appl. No.: 17/747,702

(22) Filed: May 18, 2022

(65) Prior Publication Data

US 2023/0004631 A1  Jan. 5, 2023

Related U.S. Application Data

(63) Continuation of application No. 16/878,029, filed on May 19, 2020, now Pat. No. 11,366,889, which is a continuation of application No. 15/755,432, filed as application No. PCT/CN2015/091868 on Oct. 13, 2015, now Pat. No. 10,685,100.

(51) Int. Cl.
| | | |
|---|---|---|
| *G06F 9/445* | (2018.01) | |
| *G06V 40/12* | (2022.01) | |
| *G06F 3/04817* | (2022.01) | |
| *G06F 3/0482* | (2013.01) | |
| *G06F 3/0354* | (2013.01) | |
| *G06F 21/32* | (2013.01) | |
| *G06F 3/04886* | (2022.01) | |
| *G06F 3/0488* | (2022.01) | |

(52) U.S. Cl.
CPC ......... *G06F 21/32* (2013.01); *G06F 3/03547* (2013.01); *G06F 3/0482* (2013.01); *G06F 3/0488* (2013.01); *G06F 3/04817* (2013.01); *G06F 3/04886* (2013.01); *G06F 9/4451* (2013.01); *G06F 9/44505* (2013.01); *G06V 40/1365* (2022.01); *G06F 2203/0338* (2013.01)

(58) Field of Classification Search
None
See application file for complete search history.

(56) References Cited

U.S. PATENT DOCUMENTS

| | | | | |
|---|---|---|---|---|
| 2014/0283142 A1* | 9/2014 | Shepherd | ............ | G06F 3/04817 726/30 |
| 2014/0292670 A1* | 10/2014 | Cho | ...................... | G06F 1/1647 345/173 |
| 2017/0017825 A1* | 1/2017 | Choi | .................. | G06V 40/1335 |

* cited by examiner

*Primary Examiner* — Idowu O Osifade
(74) *Attorney, Agent, or Firm* — The Webb Law Firm

(57) ABSTRACT

An operation method with fingerprint event recognition, an apparatus, and a mobile terminal relate to the field of communications technologies. The method includes receiving a fingerprint event from a user at a preset position on a mobile terminal, and displaying on a display screen of the mobile terminal at least one shortcut when the fingerprint matches a stored fingerprint event. A sliding gesture input from the user is detected, the sliding gesture starting at the preset position and extending from the preset position to select a first shortcut from the at least one shortcut, thereby improving operation efficiency.

24 Claims, 12 Drawing Sheets

OPERATION METHOD WITH FINGERPRINT RECOGNITION, APPARATUS, AND MOBILE TERMINAL

CROSS-REFERENCE TO RELATED APPLICATION

This application is continuation of U.S. patent application Ser. No. 16/878,029, filed on May 19, 2020, which is a continuation of U.S. patent application Ser. No. 15/755,432, filed on Feb. 26, 2018, which is a National Stage of International Patent Application No. PCT/CN2015/091868, filed on Oct. 13, 2015. Both of the aforementioned applications are hereby incorporated by reference in their entireties.

TECHNICAL FIELD

Embodiments of the present disclosure relate to the field of communications technologies, and in particular, to an operation method with fingerprint recognition, an apparatus, and a mobile terminal.

BACKGROUND

With development of the mobile Internet, mobile terminals are increasingly popular, and become an indispensable part of people's daily life and work. In existing mobile terminal design, some mobile terminals have a fingerprint recognition function. Fingerprint recognition means performing recognition by comparing detailed features of different fingerprints. Because persons have different fingerprints, a fingerprint can be used for identity authentication. A fingerprint is pre-stored in a mobile terminal. When an operator operates the mobile terminal, a fingerprint of the operator is collected using a fingerprint collector, and is compared with the pre-stored fingerprint. If the two fingerprints match, the operator is allowed to operate the mobile terminal. In other approaches, a fingerprint recognition technology is mainly used to recognize an identity of a user, that is, perform identity authentication using the fingerprint. When the user performs a subsequent operation on the mobile terminal after the identity authentication succeeds, multiple times of interaction between the user and the mobile terminal are still required, causing a complex operation process.

SUMMARY

Embodiments of the present disclosure provide an operation method with fingerprint recognition, an apparatus, and a mobile terminal in order to resolve the following technical problem. After an existing mobile terminal recognizes a fingerprint of a user, and can authenticate an identity of the user, multiple times of interaction still need to be performed between the user and the mobile terminal, causing relatively low operation efficiency of the mobile terminal.

According to a first aspect, an embodiment of the present disclosure provides an operation method with fingerprint recognition, applied to a mobile terminal. In a first possible implementation, the method includes obtaining a fingerprint event that is entered by a user, presenting at least one shortcut if the fingerprint event that is entered by the user matches a preset fingerprint event, obtaining an operation vector, where the operation vector is generated by operating at least one operation component of the mobile terminal by the user, running a first shortcut in the at least one shortcut according to the operation vector, and presenting a running result.

With reference to the first possible implementation of the first aspect, in a second possible implementation, the at least one operation component is a fingerprint sensor, obtaining an operation vector generated by operating at least one operation component of the mobile terminal by the user includes obtaining a sliding direction of the user on the fingerprint sensor, and running a first shortcut in the at least one shortcut according to the operation vector includes determining the first shortcut in the at least one shortcut according to the sliding direction of the user on the fingerprint sensor, and running the first shortcut. That is, in this implementation, the operation vector includes the sliding direction of the user on the fingerprint sensor.

With reference to the first possible implementation of the first aspect, in a third possible implementation, the at least one operation component is a touchscreen, obtaining an operation vector generated by operating at least one operation component of the mobile terminal by the user includes obtaining a sliding direction of the user on the touchscreen, and running a first shortcut in the at least one shortcut according to the operation vector includes determining the first shortcut in the at least one shortcut according to the sliding direction of the user on the touchscreen, and running the first shortcut. That is, in this implementation, the operation vector includes the sliding direction of the user on the touchscreen.

With reference to any one of the first to the third possible implementations of the first aspect, in a fourth possible implementation, before obtaining a fingerprint event that is entered by a user, the method further includes presenting a screen-locked interface, and presenting at least one shortcut if the fingerprint event that is entered by the user matches a preset fingerprint event includes performing an unlocking operation if the fingerprint event that is entered by the user matches the preset fingerprint event, and presenting the at least one shortcut according to a preset arrangement rule after the unlocking.

With reference to any one of the first to the third possible implementations of the first aspect, in a fifth possible implementation, before obtaining a fingerprint event that is entered by a user, the method further includes presenting a screen-locked interface, presenting at least one shortcut if the fingerprint event that is entered by the user matches a preset fingerprint event includes presenting the at least one shortcut on the screen-locked interface if the fingerprint event that is entered by the user matches the preset fingerprint event, and running a first shortcut in the at least one shortcut according to the operation vector, and presenting a running result includes running the first shortcut in the at least one shortcut according to the operation vector, and presenting the running result on the screen-locked interface, or running the first shortcut in the at least one shortcut according to the operation vector, and presenting the running result in an unlocked state.

With reference to any one of the first to the third possible implementations of the first aspect, in a sixth possible implementation, before obtaining a fingerprint event that is entered by a user, the method further includes presenting, by the mobile terminal, a screen-off state, and the presenting at least one shortcut if the fingerprint event that is entered by the user matches a preset fingerprint event includes illuminating, by the mobile terminal, a screen, and presenting the at least one shortcut if the fingerprint event that is entered by the user matches the preset fingerprint event.

With reference to any one of the first to the sixth possible implementations of the first aspect, in a seventh possible implementation, the method further includes presenting a screen-locked interface if the fingerprint event that is entered by the user does not match the preset fingerprint event, where at least one shortcut is presented on the screen-locked interface, obtaining a sliding direction of the user on the fingerprint sensor, determining, according to the sliding direction of the user on the fingerprint sensor, a second shortcut in the at least one shortcut presented on the screen-locked interface, and running the second shortcut, and presenting a running result.

With reference to any one of the first to the seventh possible implementations of the first aspect, in an eighth possible implementation, presenting at least one shortcut includes presenting the at least one shortcut in a preset region on a currently presented first interface according to a preset arrangement rule, performing a switchover from a first interface to a second interface, and presenting the at least one shortcut in a preset region on the second interface according to a preset arrangement rule, where the first interface is a currently presented interface, or presenting a suspend interface on a currently presented first interface, and presenting the at least one shortcut on the suspend interface according to a preset arrangement rule.

With reference to any one of the first to the eighth possible implementations of the first aspect, in a ninth possible implementation, after presenting at least one shortcut, the method further includes presenting a screen-locked interface when the operation vector generated by operating the at least one operation component of the mobile terminal by the user is not obtained within preset duration, and presenting a system application interface when the operation vector generated by operating the at least one operation component of the mobile terminal by the user is not obtained within preset duration.

With reference to any one of the first to the ninth possible implementations of the first aspect, in a tenth possible implementation, obtaining a fingerprint event that is entered by a user includes obtaining a fingerprint that is entered by the user, obtaining a first fingerprint gesture that is entered by the user, where the first fingerprint gesture is at least one of a tap operation, a double tap operation, a touch and hold operation, a sliding operation that is performed by the user on the fingerprint sensor using a specific fingerprint, or obtaining a second fingerprint gesture that is entered by the user, where the second fingerprint gesture is a combination of an operation generated by triggering the fingerprint sensor by the user using a specific fingerprint and an operation generated by triggering another operation component by the user.

With reference to any one of the first to the tenth possible implementations of the first aspect, in an eleventh possible implementation, different fingerprint events are corresponding to different shortcuts.

With reference to any one of the first to the tenth possible implementations of the first aspect, in a twelfth possible implementation, presenting at least one shortcut includes presenting the at least one shortcut according to the preset arrangement rule, and different fingerprint events are corresponding to different shortcut arrangement rules.

With reference to the second possible implementation of the first aspect, in a thirteenth possible implementation, the arrangement rule includes at least one of a shortcut quantity rule, a shortcut arrangement pattern rule, a shortcut arrangement position rule, or a shortcut arrangement spacing rule.

With reference to any one of the first to the thirteenth possible implementations of the first aspect, in a fourteenth possible implementation, the shortcut includes at least one of a shortcut of an application program, a shortcut of a specific function, or a shortcut of an internal element of a specific application.

With reference to any one of the first to the fourteenth possible implementations of the first aspect, in a fifteenth possible implementation, the fingerprint event is obtained at a first position on the mobile terminal, and the operation vector is generated by operating the operation component by the user starting from the first position.

According to a second aspect, an embodiment of the present disclosure provides an operation method with fingerprint recognition, applied to a mobile terminal. In a first possible implementation, the method includes obtaining a fingerprint event that is entered by a user, presenting a screen-locked interface if the fingerprint event that is entered by the user does not match a preset fingerprint event, where the screen-locked interface includes at least one shortcut, obtaining a sliding operation of the user on the fingerprint sensor, determining, according to a sliding direction of the sliding operation of the user on the fingerprint sensor, a second shortcut in the at least one shortcut included on the screen-locked interface, and running the second shortcut, and presenting a running result.

With reference to the first possible implementation of the second aspect, in a second possible implementation, the shortcut includes at least one of a shortcut of an application program, a shortcut of a specific function, or a shortcut of an internal element of a specific application.

According to a third aspect, an embodiment of the present disclosure provides a mobile terminal. In a first possible implementation, the mobile terminal includes an input device configured to obtain a fingerprint event that is entered by a user, an output device configured to present at least one shortcut if the fingerprint event that is entered by the user matches a preset fingerprint event, at least one operation component configured to obtain an operation vector, where the operation vector is generated by operating the at least one operation component of the mobile terminal by the user, and a processor configured to run a first shortcut in the at least one shortcut according to the operation vector, where the output device is further configured to present a running result after the processor runs the first shortcut.

With reference to the first possible implementation of the third aspect, in a second possible implementation, the at least one operation component is a fingerprint sensor. The at least one operation component obtaining an operation vector entered by operating the mobile terminal by the user includes that the fingerprint sensor is configured to obtain a sliding direction of the user on the fingerprint sensor, and the processor is further configured to determine the first shortcut in the at least one shortcut according to the sliding direction of the user on the fingerprint sensor, and run the first shortcut. That is, the operation vector includes the sliding direction of the user on the fingerprint sensor.

With reference to the first possible implementation of the third aspect, in a third possible implementation, the at least one operation component is a touchscreen. The at least one operation component obtaining an operation vector entered by operating the mobile terminal by the user includes that the touchscreen is configured to obtain a sliding direction of the user on the touchscreen, and the processor is further configured to determine the first shortcut in the at least one shortcut according to the sliding direction of the user on the touchscreen, and run the first shortcut. That is, the operation vector includes the sliding direction of the user on the touchscreen.

With reference to any one of the first to the third possible implementations of the third aspect, in a fourth possible implementation, the output device is further configured to present a screen-locked interface before the input device obtains the fingerprint event that is entered by the user. The processor is further configured to perform an unlocking operation if the fingerprint event that is entered by the user matches the preset fingerprint event, and the output device is further configured to present the at least one shortcut after the processor performs the unlocking operation.

With reference to any one of the first to the third possible implementations of the third aspect, in a fifth possible implementation, the output device is further configured to present a screen-locked interface before the input device obtains the fingerprint event that is entered by the user. The output device is further configured to present the at least one shortcut on the screen-locked interface if the fingerprint event that is entered by the user matches the preset fingerprint event, and present the running result on the screen-locked interface after the processor runs the first shortcut in the at least one shortcut.

With reference to any one of the first to the third possible implementations of the third aspect, in a sixth possible implementation, the output device is further configured to present a screen-off state before the input device obtains the fingerprint event that is entered by the user, and perform a power-on operation, illuminate a screen, and present the at least one shortcut if the fingerprint event that is entered by the user matches the preset fingerprint event.

With reference to any one of the first to the sixth possible implementations of the third aspect, in a seventh possible implementation, the input device is a fingerprint sensor. The output device is further configured to present a screen-locked interface if the fingerprint event that is entered by the user does not match the preset fingerprint event, where at least one shortcut is presented on the screen-locked interface. The fingerprint sensor is further configured to obtain a sliding direction of the user on the fingerprint sensor after the output device presents the screen-locked interface. The processor is further configured to determine, according to the sliding direction of the user on the fingerprint sensor, a second shortcut in the at least one shortcut presented on the screen-locked interface, and run the second shortcut, and the output device is further configured to present a running result after the processor runs the second shortcut.

With reference to any one of the first to the seventh possible implementations of the third aspect, in an eighth possible implementation, that the output device presents at least one shortcut includes that the output device presents the at least one shortcut in a preset region on a currently presented first interface according to a preset arrangement rule, the output device performs a switchover from a first interface to a second interface, and presents the at least one shortcut in a preset region on the second interface according to a preset arrangement rule, where the first interface is a currently presented interface of the output device, or the output device presents a suspend interface on a currently presented first interface, and presents the at least one shortcut on the suspend interface according to a preset arrangement rule.

With reference to any one of the first to the eighth possible implementations of the third aspect, in a ninth possible implementation, the output device is further configured to present a screen-locked interface after presenting the at least one shortcut, if the at least one operation component does not obtain, within preset duration, the operation vector entered by operating the mobile terminal by the user, or the output device is further configured to present a system application interface after presenting the at least one shortcut, if the at least one operation component does not obtain, within preset duration, the operation vector entered by operating the mobile terminal by the user.

With reference to any one of the first to the ninth possible implementations of the third aspect, in a tenth possible implementation, the input device includes a fingerprint sensor, and that the input device obtains a fingerprint event that is entered by a user includes that the fingerprint sensor obtains a fingerprint that is entered by the user, or the fingerprint sensor obtains a first fingerprint gesture that is entered by the user, where the first fingerprint gesture is at least one of a tap operation, a double tap operation, a touch and hold operation, or a sliding operation that is performed by the user on the fingerprint sensor using a specific fingerprint, or the input device obtains a second fingerprint gesture that is entered by the user, where the second fingerprint gesture is a combination of an operation generated by triggering the fingerprint sensor by the user using a specific fingerprint and an operation generated by triggering another operation component by the user.

With reference to any one of the first to the tenth possible implementations of the third aspect, in an eleventh possible implementation, different fingerprint events obtained by the input device are corresponding to different shortcuts.

With reference to any one of the first to the tenth possible implementations of the third aspect, in a twelfth possible implementation, the output device is further configured to present the at least one shortcut according to the preset arrangement rule, and different fingerprint events are corresponding to different shortcut arrangement rules.

With reference to the twelfth possible implementation of the third aspect, in a thirteenth possible implementation, the arrangement rule includes at least one of a shortcut quantity rule, a shortcut arrangement pattern rule, a shortcut arrangement position rule, or a shortcut arrangement spacing rule.

With reference to any one of the first to the thirteenth possible implementations of the third aspect, in a fourteenth possible implementation, the shortcut displayed by the output device includes at least one of a shortcut of an application program, a shortcut of a specific function, or a shortcut of an internal element of a specific application.

With reference to any one of the first to the fourteenth possible implementations of the third aspect, in a fifteenth possible implementation, the at least one operation component is the input device, and the input device is further configured to obtain the fingerprint event that is entered by the user at a first position, and obtain the operation vector that is entered by the user and that starts from the first position.

According to a fourth aspect, an embodiment of the present disclosure provides a mobile terminal. In a first possible implementation, the mobile terminal includes a fingerprint sensor configured to obtain a fingerprint event that is entered by a user using the fingerprint sensor, an output device configured to present a screen-locked interface if the fingerprint event that is entered by the user does not match a preset fingerprint event, where the screen-locked interface includes at least one shortcut, where the fingerprint sensor is further configured to obtain a sliding operation of the user on the fingerprint sensor, and a processor configured to determine, according to a sliding direction of the sliding operation of the user on the fingerprint sensor, a second shortcut in the at least one shortcut included on the screen-locked interface, and run the first shortcut, where the output device is further configured to present a running result after the processor runs the first shortcut.

With reference to the first possible implementation of the fourth aspect, in a second possible implementation, the shortcut includes at least one of a shortcut of an application program, a shortcut of a specific function, or a shortcut of an internal element of a specific application.

According to a fifth aspect, an embodiment of the present disclosure provides an apparatus. In a first possible implementation, the apparatus includes a fingerprint event obtaining module configured to obtain a fingerprint event that is entered by a user, a shortcut presentation module configured to present at least one shortcut if the fingerprint event that is entered by the user matches a preset fingerprint event, an operation vector obtaining module configured to obtain an operation vector, where the operation vector is generated by operating at least one operation component of a mobile terminal by the user, a running module configured to run a first shortcut in the at least one shortcut according to the operation vector, and a result presentation module configured to present a running result after the running module runs the first shortcut.

With reference to the first possible implementation of the fifth aspect, in a second possible implementation, the at least one operation component is a fingerprint sensor, the operation vector obtaining module is further configured to obtain a sliding direction of the user on the fingerprint sensor, and the running module is further configured to determine the first shortcut in the at least one shortcut according to the sliding direction of the user on the fingerprint sensor, and run the first shortcut. That is, the operation vector includes the sliding direction of the user on the fingerprint sensor.

With reference to the first possible implementation of the fifth aspect, in a third possible implementation, the at least one operation component is a touchscreen, the operation vector obtaining module is further configured to obtain a sliding direction of the user on the touchscreen, and the running module is further configured to determine the first shortcut in the at least one shortcut according to the sliding direction of the user on the touchscreen, and run the first shortcut. That is, the operation vector includes the sliding direction of the user on the touchscreen.

With reference to any one of the first to the third possible implementations of the fifth aspect, in a fourth possible implementation, the apparatus further includes a first screen-locked presentation module, the first screen-locked presentation module is configured to present a screen-locked interface before the fingerprint event obtaining module obtains the fingerprint event that is entered by the user, and the shortcut presentation module is further configured to perform an unlocking operation if the fingerprint event that is entered by the user matches the preset fingerprint event, and present the at least one shortcut according to a preset arrangement rule after the unlocking.

With reference to any one of the first to the third possible implementations of the fifth aspect, in a fifth possible implementation, the apparatus further includes a second screen-locked presentation module, the second screen-locked presentation module is configured to present a screen-locked interface before the fingerprint event obtaining module obtains the fingerprint event that is entered by the user, the shortcut presentation module is further configured to present the at least one shortcut on the screen-locked interface if the fingerprint event that is entered by the user matches the preset fingerprint event, and the result presentation module is further configured to present the running result on the screen-locked interface after the running module runs the first shortcut in the at least one shortcut, or the result presentation module is further configured to present the running result in an unlocked state after the running module runs the first shortcut in the at least one shortcut.

With reference to any one of the first to the third possible implementations of the fifth aspect, in a sixth possible implementation, the apparatus further includes a screen-off control module, the screen-off control module is configured to enable the mobile terminal to present a screen-off state before the fingerprint event obtaining module obtains the fingerprint event that is entered by the user, and the shortcut presentation module is further configured to illuminate a screen, and present the at least one shortcut if the fingerprint event that is entered by the user matches the preset fingerprint event.

With reference to any one of the first to the sixth possible implementations of the fifth aspect, in a seventh possible implementation, the apparatus further includes a third screen-locked presentation module configured to present a screen-locked interface if the fingerprint event that is entered by the user does not match the preset fingerprint event, where at least one shortcut is presented on the screen-locked interface, the operation vector obtaining module is further configured to obtain a sliding direction of the user on a fingerprint sensor, the running module is further configured to determine, according to the sliding direction of the user on the fingerprint sensor, a second shortcut in the at least one shortcut presented on the screen-locked interface, and run the second shortcut, and the result presentation module is further configured to present a running result after the running module runs the second shortcut.

With reference to any one of the first to the seventh possible implementations of the fifth aspect, in an eighth possible implementation, that the shortcut presentation module presents at least one shortcut includes the shortcut presentation module presents the at least one shortcut in a preset region on a currently presented first interface according to a preset arrangement rule, the shortcut presentation module performs a switchover from a first interface to a second interface, and presents the at least one shortcut in a preset region on the second interface according to a preset arrangement rule, where the first interface is a currently presented interface, or the shortcut presentation module presents a suspend interface on a currently presented first interface, and presents the at least one shortcut on the suspend interface according to a preset arrangement rule.

With reference to any one of the first to the eighth possible implementations of the fifth aspect, in a ninth possible implementation, the apparatus further includes a timing presentation module, the timing presentation module is configured to present a screen-locked interface after the shortcut presentation module presents the at least one shortcut, when the operation vector generated by operating the at least one operation component of the mobile terminal by the user is not obtained within preset duration, or the timing presentation module is configured to present a system application interface after the shortcut presentation module presents the at least one shortcut, when the operation vector generated by operating the at least one operation component of the mobile terminal by the user is not obtained within preset duration.

With reference to any one of the first to the ninth possible implementations of the fifth aspect, in a tenth possible implementation, the fingerprint event obtaining module is further configured to obtain a fingerprint that is entered by the user, obtain a first fingerprint gesture that is entered by the user, where the first fingerprint gesture is at least one of a tap operation, a double tap operation, a touch and hold operation, or a sliding operation that is performed by the user on the fingerprint sensor using a specific fingerprint, or obtain a second fingerprint gesture that is entered by the user, where the second fingerprint gesture is a combination of an operation generated by triggering the fingerprint sensor by the user using a specific fingerprint and an operation generated by triggering another operation component by the user.

With reference to any one of the first to the tenth possible implementations of the fifth aspect, in an eleventh possible implementation, different fingerprint events obtained by the fingerprint event obtaining module are corresponding to different shortcuts.

With reference to any one of the first to the tenth possible implementations of the fifth aspect, in a twelfth possible implementation, the shortcut presentation module is further configured to present the at least one shortcut according to the preset arrangement rule, and different fingerprint events obtained by the fingerprint event obtaining module are corresponding to different shortcut arrangement rules.

With reference to the twelfth possible implementation of the fifth aspect, in a thirteenth possible implementation, the arrangement rule includes at least one of a shortcut quantity rule, a shortcut arrangement pattern rule, a shortcut arrangement position rule, or a shortcut arrangement spacing rule.

With reference to any one of the first to the thirteenth possible implementations of the fifth aspect, in a fourteenth possible implementation, the shortcut presented by the shortcut presentation module includes at least one of a shortcut of an application program, a shortcut of a specific function, or a shortcut of an internal element of a specific application.

With reference to any one of the first to the fourteenth possible implementations of the fifth aspect, in a fifteenth possible implementation, the fingerprint event obtaining module is further configured to obtain, at a first position on the mobile terminal, the fingerprint event that is entered by the user, and the operation vector obtaining module is further configured to obtain the operation vector generated by operating the operation component by the user starting from the first position.

According to a sixth aspect, an embodiment of the present disclosure provides an apparatus. In a first possible implementation, the apparatus includes a fingerprint event obtaining module configured to obtain a fingerprint event that is entered by a user, a screen-locked presentation module configured to present a screen-locked interface if the fingerprint event that is entered by the user does not match a preset fingerprint event, where the screen-locked interface includes at least one shortcut, a sliding operation obtaining module configured to obtain a sliding operation of the user on the fingerprint sensor, a determining module configured to determine, according to a sliding direction of the sliding operation of the user on the fingerprint sensor, a first shortcut in the at least one shortcut included on the screen-locked interface, a running module configured to run the first shortcut, and a result presentation module configured to present a running result after the running module runs the first shortcut.

With reference to the first possible implementation of the sixth aspect, in a second possible implementation, the shortcut on the screen-locked interface presented by the screen-locked presentation module includes at least one of a shortcut of an application program, a shortcut of a specific function, or a shortcut of an internal element of a specific application.

According to a seventh aspect, an embodiment of the present disclosure provides an operation method with fingerprint recognition, applied to a mobile terminal. In a first possible implementation, the method includes presenting a screen-locked interface, obtaining a fingerprint event that is entered by a user, performing an unlocking operation if the fingerprint event that is entered by the user matches a preset fingerprint event, presenting at least one shortcut according to a preset arrangement rule after the unlocking, obtaining an operation vector, where the operation vector is generated by operating at least one operation component of the mobile terminal by the user, running a first shortcut in the at least one shortcut according to the operation vector, and presenting a running result.

With reference to the first possible implementation of the sixth aspect, in a second possible implementation, the fingerprint event is obtained at a first position on the mobile terminal, and the operation vector is generated by operating the operation component by the user starting from the first position.

With reference to the first or the second possible implementation of the sixth aspect, in a third possible implementation, the at least one operation component is a fingerprint sensor, and the operation vector includes a sliding direction of the user on the fingerprint sensor.

With reference to the first or the second possible implementation of the sixth aspect, in a fourth possible implementation, the at least one operation component is a touchscreen, and the operation vector includes a sliding direction of the user on the touchscreen.

According to a seventh aspect, an embodiment of the present disclosure provides an operation method with fingerprint recognition, applied to a mobile terminal. In a first possible implementation, the method includes presenting an unlocked interface, obtaining a fingerprint event that is entered by a user, presenting at least one shortcut on the screen-locked interface if the fingerprint event that is entered by the user matches a preset fingerprint event, obtaining an operation vector, where the operation vector is generated by operating at least one operation component of the mobile terminal by the user, and running a first shortcut in the at least one shortcut according to the operation vector, and presenting a running result on the screen-locked interface, or running a first shortcut in the at least one shortcut according to the operation vector, and presenting a running result in an unlocked state.

With reference to the first possible implementation of the seventh aspect, in a second possible implementation, the fingerprint event is obtained at a first position on the mobile terminal, and the operation vector is generated by operating the operation component by the user starting from the first position.

With reference to the first or the second possible implementation of the seventh aspect, in a third possible implementation, the at least one operation component is a fingerprint sensor, and the operation vector includes a sliding direction of the user on the fingerprint sensor.

With reference to the first or the second possible implementation of the seventh aspect, in a fourth possible implementation, the at least one operation component is a touchscreen, and the operation vector includes a sliding direction of the user on the touchscreen.

According to an eighth aspect, an embodiment of the present disclosure provides an operation method with fingerprint recognition, applied to a mobile terminal. In a first possible implementation, the method includes presenting, by the mobile terminal, a screen-off state, obtaining a fingerprint event that is entered by a user, illuminating, by the mobile terminal, a screen, and presenting at least one shortcut if the fingerprint event that is entered by the user matches a preset fingerprint event, obtaining an operation vector, where the operation vector is generated by operating at least one operation component of the mobile terminal by the user, and running a first shortcut in the at least one shortcut according to the operation vector, and presenting a running result.

With reference to the first possible implementation of the eighth aspect, in a second possible implementation, the fingerprint event is obtained at a first position on the mobile terminal, and the operation vector is generated by operating the operation component by the user starting from the first position.

With reference to the first or the second possible implementation of the eighth aspect, in a third possible implementation, the at least one operation component is a fingerprint sensor, and the operation vector includes a sliding direction of the user on the fingerprint sensor.

With reference to the first or the second possible implementation of the eighth aspect, in a fourth possible implementation, the at least one operation component is a touchscreen, and the operation vector includes a sliding direction of the user on the touchscreen.

In the embodiments of the present disclosure, a shortcut is presented by performing matching between fingerprint events, a to-be-run shortcut is determined according to an operation vector generated by operating a mobile terminal by a user, the shortcut is run, and a running result is presented such that the user can conveniently and quickly run the shortcut, thereby reducing operation duration, and improving operation efficiency.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show only some but not all the embodiments of the present disclosure. Persons of ordinary skill in the art may still derive other drawings from these accompanying drawings without creative efforts.

DESCRIPTION OF EMBODIMENTS

Figure 1:
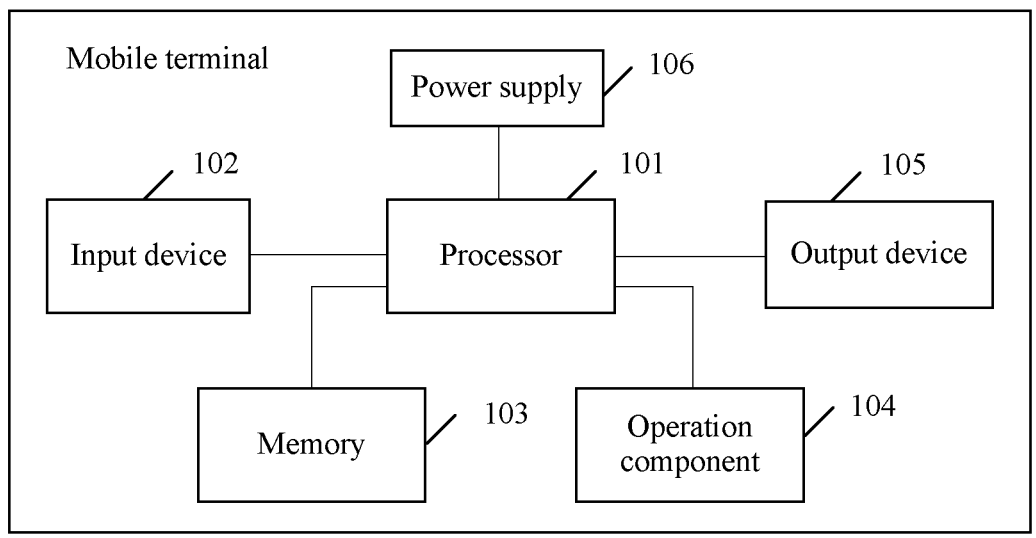
FIG. 1 is a schematic structural diagram of a mobile terminal according to an embodiment of the present disclosure.

To make the objectives, technical solutions, and advantages of the present disclosure clearer, the following further describes the embodiments of the present disclosure in detail with reference to the accompanying drawings. All other embodiments obtained by persons of ordinary skill in the art without creative efforts shall fall within the protection scope of the present disclosure.

In specific description in the following embodiments, concepts such as "screen-locked," "screen-off," and "screen-on" may be used. Based on content known by persons of ordinary skill in the art, this application gives a further explanation and description. It should be noted that, the following description is only intended for further description, and constitutes no limitation on an explanation of a common concept term in the technical field.

Screen-locked may be understood as a state in which a screen of a mobile terminal, or a terminal for short, is locked because a user wants to protect privacy, prevent a misoperation, and so on. A screen-locked interface may be considered as a display interface that is presented on a display screen of the terminal and that is locked in a password-protected state, or a display interface locked in a gesture-protected state. On the screen-locked interface, the terminal may present different display interfaces. For example, the terminal may present a specific screen-locked picture, present a specific screen-locked magazine, or present a specific screen-locked text. When the terminal receives a password or gesture authentication instruction that meets a preset condition, the terminal may terminate a locked state, and present a system interface or an application interface of an application program.

In addition to a fault-based black screen of a terminal due to a hardware fault or a software conflict, "screen-off" may be understood as a state in which a screen of the terminal is not powered on or is not illuminated because a user wants to save power, or the like. From a perspective of the user, direct representation of "screen-off" is that the screen of the terminal currently presents the same as the terminal does when the terminal is powered off or switched off. In a screen-off state, a physical button of the terminal may be triggered or biological feature information may be entered such that the terminal powers on the screen or illuminates the screen according to input information. In use of a technical term in the art, "screen-off" may also mean that the screen is turned off.

"Screen-on" may be understood as a state in which a terminal illuminates a screen and presents a display interface. In a screen-on state, the terminal may present an operation interface that is needed by a user. For example, the terminal may present an operation interface of an application, or present a desktop container such that the user can select an icon. Alternatively, the terminal may present an interface that is temporarily not needed by a user but is necessary for implementing a function of the terminal. For example, the first step of starting the terminal is illuminating the screen, and in this case, it may be understood as the screen-on state.

An application program may also be referred to as an application, and is a computer program for completing one or more specific types of work. The application program is run in a user mode, may interact with a user, and has a visible user interface. Generally, the application program includes two parts a graphical user interface (GUI) and an engine.

A shortcut is a command line used for quickly starting a task, for example, a link that is provided by a system and is for quickly starting a program, opening a file, or unfolding a folder, and is usually in a form of an icon. The shortcut is a common expression of multiple possible operation entrances. The shortcut may be but is not limited to an application program, a specific function, a contact, a setting option, a notification bar, or a shortcut operation bar. In the embodiments of the present disclosure, the shortcut may be a link for starting an application program, for example, a link for starting one of the following application programs WECHAT, Google Search, a camera, or the like, or may be a link for starting an element in an application program, for example, a link for starting a contact in a contact application, a link for starting a short message service message in a short message service message application, or a link for enabling a function setting in a settings application. Herein, starting an element in a program may be understood as viewing the element in the program, or triggering the element in the program.

An event may be understood as an object that is sent by a system to an application program when a finger of a user taps a screen and moves on the screen. In a technical implementation, the user may touch not only the screen, but also various sensors, various physical buttons, and the like. The system transfers, according to a specific path, the event to an object that can process the event. For example, in IOS, one UITouch object represents one touch, and one UIEvent object represents one event. An event object includes all touch objects corresponding to a current multi-touch sequence, and may further provide a touch object associated with a specific view or window. A touch event includes a time aspect and a space aspect. Information about the time aspect is referred to as a phase that represents whether a touch just began, whether the touch is moving or is in a still state, and when the touch ends (for example, when a finger raises from the screen). Touch information further includes information about a current position in a view or a window, and information about a previous position. When a finger touches the screen, the touch is associated with a window or a view. This association is maintained in an entire life cycle of the event.

A biological feature is a human physiological feature or a behavioral feature in a general sense. A terminal may perform identity authentication or the like using a biological recognition technology according to the human biological feature. For example, the biological feature recognition technology is closely combined with technical means such as optics, acoustics, a biosensor, and a biostatistical principle using a computer, and personal identity authentication is performed using the inherent human physiological feature and the behavioral feature. The physiological features include hand shape, fingerprint, face shape, iris, retina, pulse, pinna, and the like. The behavioral features include signature, voice, typing force, and the like.

A commonly used biological feature is a fingerprint. The fingerprint is formed by epidermal ridges of a human finger. A fingerprint of a person is affected by both a gene and an environment. Although all persons have fingerprints, the fingerprints are different. Because a fingerprint sensor technology is gradually mature, a fingerprint sensor is used in a growing quantity of terminals in order to enhance device security, and improve operation experience of a user. In the embodiments of the present disclosure, fingerprint application may include but is not limited to the following cases In a first case, the fingerprint is applied to unlocking and payment, is used as a movement cursor on an operation panel, and is used to enable an operation, content protection, and the like. Enabling an operation is usually defining an application program for each finger, and a corresponding application program may be started by entering a corresponding fingerprint. For example, a fingerprint sensor can record ten fingerprints, and may associate each fingerprint with an application program. For example, a fingerprint of an index finger corresponds to opening a camera, and a fingerprint of a middle finger corresponds to turning on BLUETOOTH. When a user enters a specific fingerprint, a specific application is entered.

In a second case, different application programs are started using fingerprint gestures such as a tap gesture, a double tap gesture, and a touch and hold gesture. For example, tapping using an index finger corresponds to opening a camera, and double tapping the fingerprint sensor using the index finger corresponds to turning on BLUETOOTH.

In a third case, multiple shortcuts are displayed on a screen by entering a fingerprint, and a corresponding application is entered by tapping a shortcut. Fingerprint recognition used in the embodiments may be capacitive fingerprint recognition, and a fingerprint sensor is a capacitive sensor, or may be ultrasonic fingerprint recognition, and there is no need to directly come into contact with a finger. An ultrasonic sensor mainly depends on intensity of a reflected wave in order to form a fingerprint ridge image. When reaching a finger surface via a surface of the sensor, an ultrasonic wave emitted from an ultrasonic wave source is reflected. A receiving device obtains a reflected signal of the ultrasonic wave, measures a range of the reflected signal, obtains a depth of a ridge, and forms a fingerprint image. The image is a real reflection of an actual ridge terrain (roughness). For a capacitive fingerprint recognition technology, refer to CN104748770, which is incorporated in this specification by reference in its entirety. For an ultrasonic wave fingerprint recognition technology, refer to CN104881629, which is incorporated in this specification by reference in its entirety.

When fingerprint feature recognition is not used, if a user uses a terminal, for example, needs to open a specific application in order to use a service, the user usually needs to search a system interface for an icon corresponding to the application, and tap the icon of the application after finding the icon, to display an operation interface of the application, and use a service corresponding to the application. When the terminal is still in a screen-locked state and a screen-off state, the user needs to operate more procedures, and an operation is more complex. For example, the terminal may be in the screen-off state, and in this case, the user needs to perform a corresponding operation to illuminate a screen. After the screen of the terminal is illuminated, the screen may be not locked, and in this case, the user may directly search the system interface for a corresponding application icon. Alternatively, after the screen is illuminated, the terminal may be in the screen-locked state, and in this case, the user needs to perform an unlocking operation. The terminal presents the system interface only when unlocking information entered by the user is determined to be correct by means of authentication. In this case, the user further needs to search the system interface for a corresponding application icon, and perform an operation of triggering the application icon. If an operation of the user can be simplified, efficiency of operating the mobile terminal by the user can be improved.

As shown in FIG. 1, FIG. 1 is a schematic structural diagram of a mobile terminal according to an embodiment of the present disclosure. The mobile terminal includes a processor 101, a memory 103, an input device 102, an output device 105, an operation component 104, and the like. There is an overlap between the input device 102 and the operation component 104. In some scenarios, the input device 102 and the operation component 104 may be a same electronic component, such as a fingerprint sensor. In some scenarios, the input device 102 and the operation component 104 may be different electronic components. For example, the input device 102 is a touchscreen, and the operation component 104 is a gyro sensor.

Figure 2:
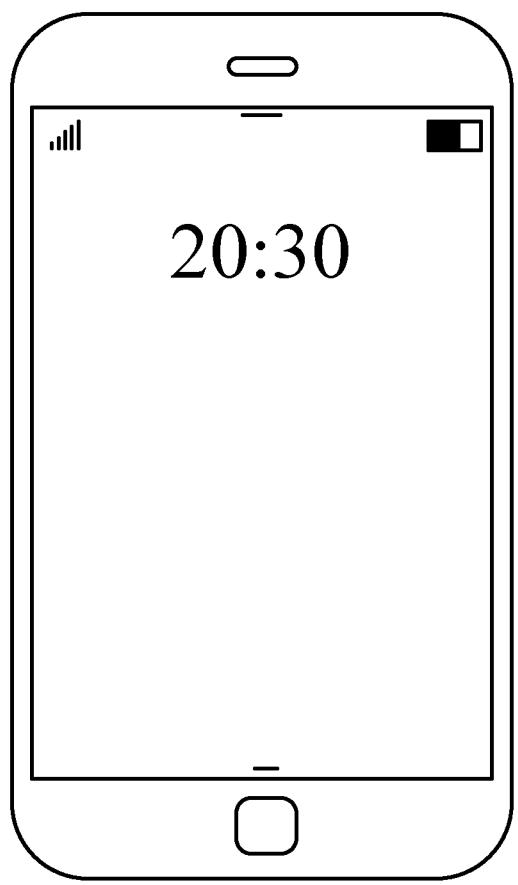
FIG. 2 is a schematic diagram of a display interface of a mobile terminal according to an embodiment of the present disclosure.

FIG. 2 is a schematic diagram of a display interface of a mobile terminal according to an embodiment of the present disclosure. The mobile terminal may include the structural components shown in FIG. 1.

The processor 101 is a control center of the mobile terminal and connected to each part of the entire mobile terminal using various interfaces and lines, and by running or executing a software program or a module or both that is stored in the memory 103 and by invoking data stored in the memory 103, performs various functions of the mobile terminal and/or processes data. The processor 101 includes an integrated circuit (IC). For example, the processor 101 may include a single packaged IC, or may include multiple connected packaged ICs that have a same function or different functions. For example, the processor 101 may include only a central processing unit (CPU), or may be a combination of a graphical processing unit (GPU), a digital signal processor (DSP), an application specific IC (ASIC), and a control chip (for example, a baseband chip) in a communications management module. In an implementation of the present disclosure, the CPU may be a single computing core, or may include multiple computing cores. The CPU performs a corresponding function by invoking a related application program.

The memory 103 may be configured to store a software program configuration and a system configuration. By reading the software program configuration and the system configuration that are stored in the memory 103, the processor 101 executes various functional applications of the mobile terminal and implements data processing. The memory 103 includes a program configuration storage area and a system configuration storage area. The program configuration storage area may store configuration information of at least one application program such as a sound play program or an image play program. The system storage area may store system configuration data that is created according to use of the mobile terminal, and the like. In a specific implementation of the present disclosure, the memory 103 may include a non-volatile memory, such as a nonvolatile random access memory (NVRAM), a phase change random access memory (PRAM), or a magnetoresistive random access memory (MRAM), and may further include at least one magnetic disk storage component, an electrically erasable programmable read-only memory (EEPROM), or a flash memory component, such as a NOR flash memory or a NAND flash memory. The nonvolatile memory stores an operating system and an application program that are executed by the processor 101. The processor 101 loads, from the nonvolatile memory, a running program and data to the memory 103, and stores digital content in a massive storage apparatus. The operating system includes various components and/or drivers that are configured to control and manage a regular system task, such as memory management, storage device control, or power management, and facilitate communication between various software and hardware. In an implementation of the present disclosure, the operating system may be an ANDROID operating system of GOOGLE Incorporation, an IOS operating system developed by APPLE Incorporation, a WINDOWS operating system developed by MICROSOFT Corporation, or an embedded operating system such as VXWORKS. No limitation is imposed in this embodiment of the present disclosure.

The input device 102 is configured to implement interaction between a user and the mobile terminal and/or enter information to the mobile terminal. For example, the input device 102 may receive digit or character information that is entered by the user in order to generate signal input related to a user setting or function control. In a specific implementation of the present disclosure, the input device 102 may be a touch-sensitive surface, or may be another man-machine interaction interface, such as a substantive input key or a microphone, or may be another apparatus for obtaining external information, for example, a camera. The touch-sensitive surface is also referred to as a touchpoint or a touchscreen, and may collect the user's operation action of touching or approaching on the touch-sensitive surface, for example, an operation action performed by the user on the touch-sensitive surface or at a position near the touch-sensitive surface using any proper object or accessory such as a figure or a stylus, and drive a corresponding connection apparatus according to a preset program. Optionally, the touch-sensitive surface may include two parts a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into coordinates of a touch point, and then transfers the coordinates of the touch point to a processing unit in a storage and processing module. The touch controller may further receive and execute a command sent from the processor. In addition, the touch-sensitive surface may be implemented using multiple types such as a resistive type, a capacitive type, an infrared ray, and a surface acoustic wave. In another implementation of the present disclosure, the substantive input key used in the input device may include but is not limited to one or more of a physical keyboard, a function key (such as a volume control button or an an/off button), a trackball, a mouse, a joystick, or the like. An input module in a form of a microphone may collect a voice that is input by the user or an environment, and convert the voice into a command that is in a form of an electric signal and may be executed by the processor 101. In some other implementations of the present disclosure, the input device 102 may be various sensing components, such as a Hall component used to detect a physical quantity of the mobile terminal, for example, force, torque, pressure, stress, a position, displacement, a speed, an acceleration, an angle, an angular velocity, a rotation quantity, a rotational speed, and duration in which a working state changes, and converts the physical quantity into an electric quantity for detection and control. Other sensing components may further include a gravity sensor, a tri-axis accelerometer, a gyroscope, and the like. The input device may further include a fingerprint sensor. The fingerprint sensor may be a separate fingerprint sensor, or may be integrated with the touchscreen of the terminal.

An output device may be further a display panel configured in a form of a liquid crystal display (LCD), an organic light-emitting diode (OLED), a field emission display (FED), or the like. Alternatively, the output device 105 is a reflective display, for example, an electrophoretic display, or a display that uses an interferometric modulation of light technology. In a specific implementation of the present disclosure, a display includes a touch-sensitive surface and a display screen. The touch-sensitive surface may also be used as a display panel of the output device 105. For example, after detecting a gesture operation of touching or approaching on the touch-sensitive surface, the touch-sensitive surface transfers the gesture operation to the processing unit to determine a type of a touch event, and then the processing unit provides corresponding visual output on the display panel according to the type of the touch event. In some embodiments, the touch-sensitive surface and the display panel may be integrated to implement input and output functions of the mobile terminal.

Figure 3:
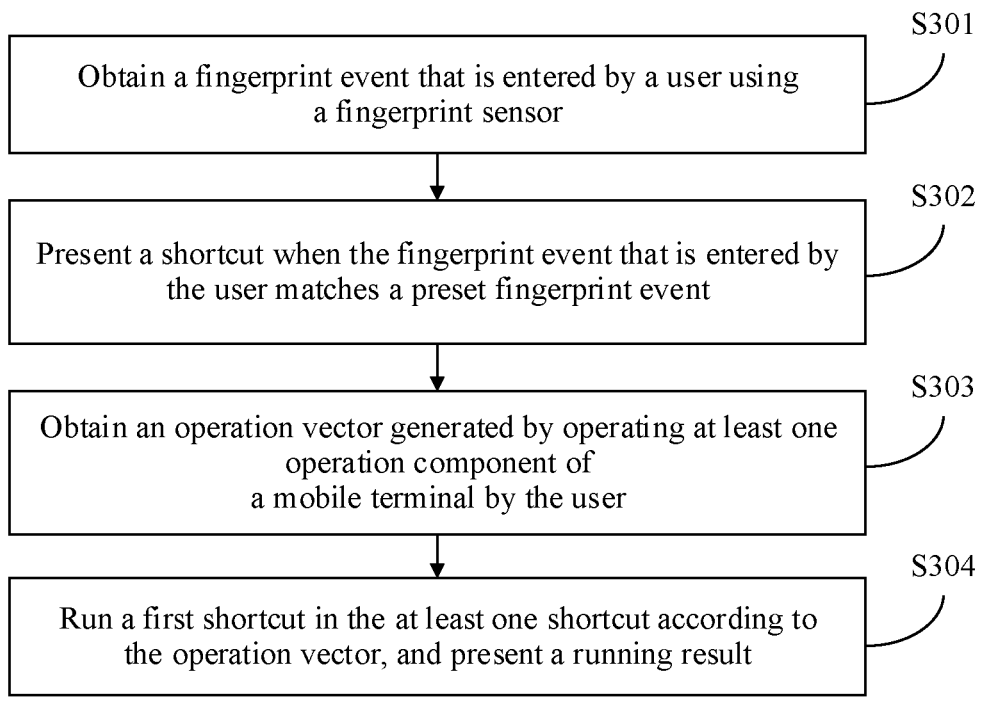
FIG. 3 is a flowchart of an operation method with fingerprint recognition according to an embodiment of the present disclosure.

As shown in FIG. 3, FIG. 3 is a flowchart of an operation method with fingerprint recognition according to an embodiment of the present disclosure. The method includes the following steps.

Step S301: Obtain a fingerprint event that is entered by a user using a fingerprint sensor.

The fingerprint sensor of a mobile terminal may be a fingerprint sensor. The fingerprint sensor may be disposed at a lower part of a screen. Alternatively, the fingerprint sensor may be disposed on the back of the mobile terminal, for example, a position of a fingerprint sensor of HUAWEI Ascend Mate 7. Alternatively, the fingerprint sensor may be disposed on a side of the mobile terminal.

The fingerprint sensor of the mobile terminal may be a separate component, or may be integrated with another component. For example, the fingerprint sensor is integrated with a touchscreen, and a fixed position is designated on the screen in advance in order to facilitate fingerprint authentication on a fingerprint entered in the fixed region. Alternatively, a function of fingerprint input and/or recognition is extended to the entire screen or any position on the screen, and authentication is performed on a single fingerprint or is simultaneously performed on multiple fingerprints. In a technical implementation in which the screen is the fingerprint sensor, an extra fingerprint sensor layer may be added to a display screen. Alternatively, the fingerprint sensor is connected to a surface of a bottom cover using an integrated circuit, or is connected to a topmost layer of the screen. Alternatively, the whole fingerprint sensor is manufactured into a panel, and is disposed at an upper part of a display screen.

Optionally, the fingerprint event may be a fingerprint, that is, a fingerprint image entered by the user.

Optionally, the fingerprint event may be a fingerprint gesture. A gesture may be understood as a manner in which a finger of the user touches an operation component (such as the screen or the fingerprint sensor), for example, a tap gesture, a double tap gesture, a multi-touch (pinch and spread) gesture, or a sliding gesture. The fingerprint gesture may be understood as an operation in which the user triggers the fingerprint sensor using a specific or non-specific fingerprint, for example, at least one of a tap operation, a double tap operation, a touch and hold operation, or a sliding operation that is performed using one or several fingerprints, for example, a tap operation performed using an index finger, a double tap operation performed using a thumb, a touch and hold operation performed using a middle finger, or a sliding operation performed using an index finger.

Optionally, the fingerprint gesture may be a combination of a fingerprint operation and a non-fingerprint operation, that is, a combination of an operation instruction generated by triggering the fingerprint sensor by the user using a specific fingerprint and an operation instruction generated by triggering another operation component by the user, for example, a combination of the operation of triggering the fingerprint sensor using a fingerprint and an operation of another sensor. For example, this type of fingerprint gesture may include a combination of an instruction for triggering the fingerprint sensor and an instruction for triggering an acceleration sensor. For example, a device is shaken when a touch and hold operation is performed on the fingerprint sensor. Alternatively, this type of fingerprint gesture may include a combination of an instruction for triggering the fingerprint sensor and an instruction for triggering a pressure sensor. For example, the fingerprint sensor is pressed for more than 5 seconds with specific force.

Step S302: Present a shortcut when the fingerprint event that is entered by the user matches a preset fingerprint event.

When the fingerprint event that is entered by the user is a fingerprint image, that the fingerprint event that is entered by the user matches a preset fingerprint event includes a fingerprint image that is entered by the user is the same as one fingerprint image of multiple pre-stored fingerprint images, or a similarity is greater than or equal to a preset threshold.

When the fingerprint event that is entered by the user is a fingerprint gesture of touching the fingerprint sensor by the user, that is, at least one of a tap operation, a double tap operation, a touch and hold operation, or a sliding operation that is performed by the user on the fingerprint sensor using a specific fingerprint, that the fingerprint event that is entered by the user matches a preset fingerprint event includes a fingerprint for touching the fingerprint sensor by the user is the same as a preset fingerprint of a fingerprint gesture, and operations performed on the fingerprint sensor are the same, or a fingerprint for touching the fingerprint sensor by the user is the same as a preset fingerprint of a fingerprint gesture, and operations performed on the fingerprint sensor are similar. For example, a deviation between sliding tracks or sliding directions falls within a preset deviation range.

When the fingerprint event that is entered by the user is a fingerprint gesture, that is, a combination of an operation instruction generated by triggering the fingerprint sensor by the user using a specific fingerprint and an operation instruction generated by triggering another operation component by the user, that the fingerprint event that is entered by the user matches a preset fingerprint event includes a fingerprint for touching the fingerprint sensor by the user is the same as a preset fingerprint of a fingerprint gesture, other operation components touched by the user are the same, and operations for touching the other components by the user are the same or a deviation falls within a preset range.

For example, a presentation manner may include at least one of the following manners.

Figure 4:
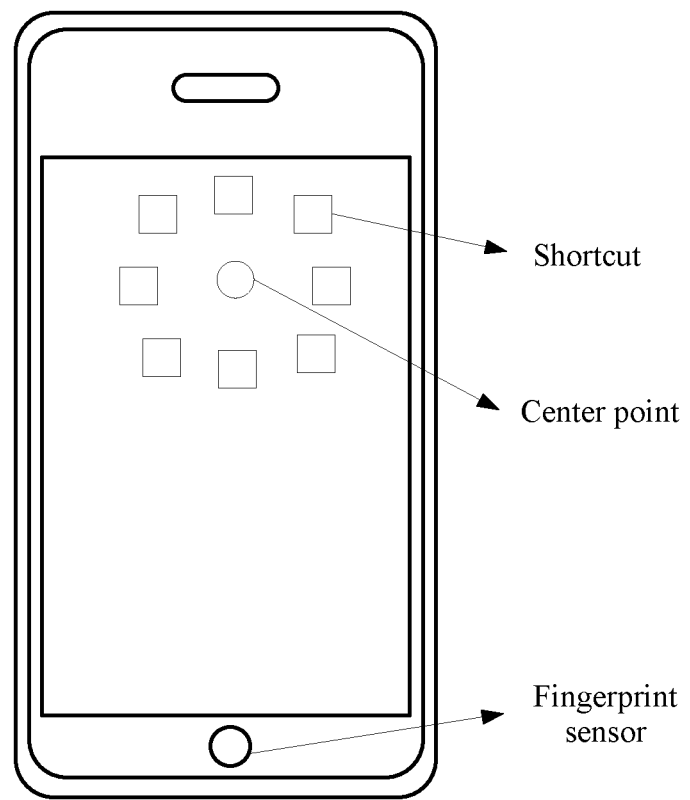
FIG. 4 is a schematic diagram of a display interface of a mobile terminal according to an embodiment of the present disclosure.

Optionally, the screen currently presents a first interface, such as a system interface, and the shortcut is presented in a region on the first interface according to a preset arrangement rule. As shown in FIG. 4, the fingerprint sensor is disposed at a lower part of the display screen, and shortcuts may be arranged as shown in FIG. 4, and are dispersedly arranged using a coordinate point as a center. The region may be a center region on the system interface, or a one-hand operation region for recognizing a left hand or a right hand of the user.

Optionally, the screen currently presents a first interface. When the fingerprint event that is entered by the user matches the preset fingerprint event, a switchover from the first interface to a second interface is performed, and the second interface is presented. The shortcut is presented on the second interface according to a preset arrangement rule. For example, the first interface is a running interface of an application. When the fingerprint event that is entered by the user matches the preset fingerprint event, the terminal may exit the application, or run the application in a background, and present the shortcut on the second interface (such as a system interface).

Figure 10:
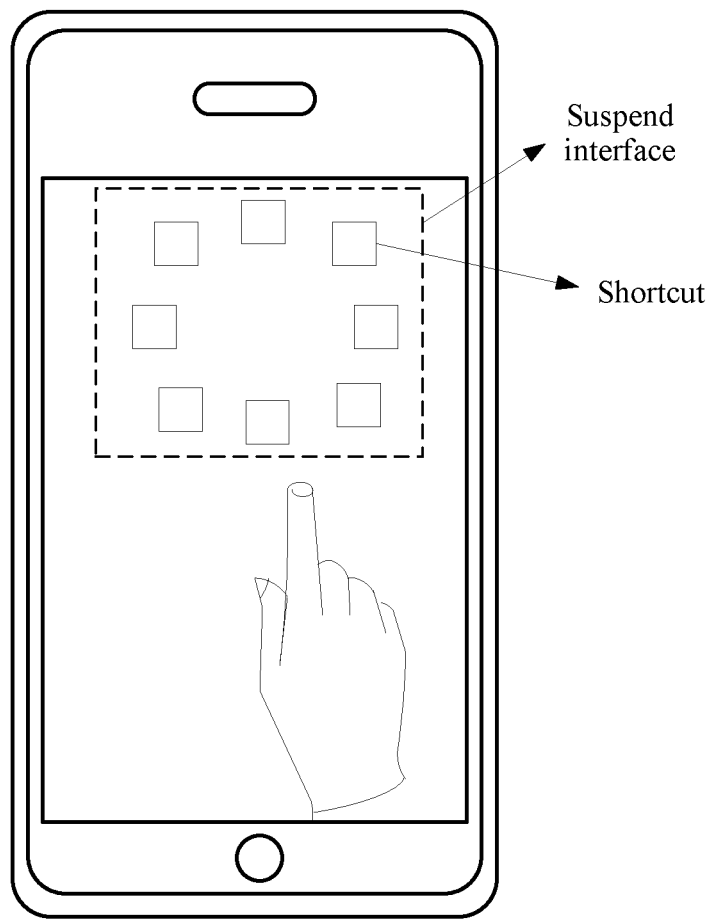
FIG. 10 is a schematic diagram of a display interface of a mobile terminal according to an embodiment of the present disclosure.

Optionally, as shown in FIG. 10, FIG. 10 is a schematic diagram of a display interface of a mobile terminal according to an embodiment of the present disclosure. A suspend interface is presented on a currently presented first interface, and at least one shortcut is presented on the suspend interface according to a preset arrangement rule. The suspend interface is in a form of a suspend window, and the shortcut is presented in the suspend window.

Optionally, the shortcut may be presented on the display screen of the mobile terminal, or may be presented on another device using the mobile terminal. For example, the mobile terminal projects, into a wall using an output device, content displayed on the display screen, and presents the shortcut on the wall.

Step S303: Obtain an operation vector generated by operating at least one operation component of a mobile terminal by the user.

A vector is a quantity that has a direction, and is also referred to as a vector in mathematics. A vector in physics is a physical quantity that has a direction. The operation vector may be understood as an operation direction of the user on the operation component. The touchscreen is used as an example. The user performs a sliding operation on the touchscreen, and a sliding track is generated. The sliding track is a track formed by action points of the sliding operation on the touchscreen. An operation vector of the sliding operation may be determined according to the sliding track. Similarly, if the operation component is the fingerprint sensor, and the user performs a sliding operation on the fingerprint sensor, the sliding track is a track formed by actions point of the sliding operation on the fingerprint sensor. An operation vector of the sliding operation may be determined according to the sliding track such as a sliding start point and a sliding end point. As shown in FIG. 4, the fingerprint sensor is disposed at the lower part of the display screen, and the terminal obtains the sliding operation on the fingerprint sensor, and determines the sliding direction.

Figure 5:
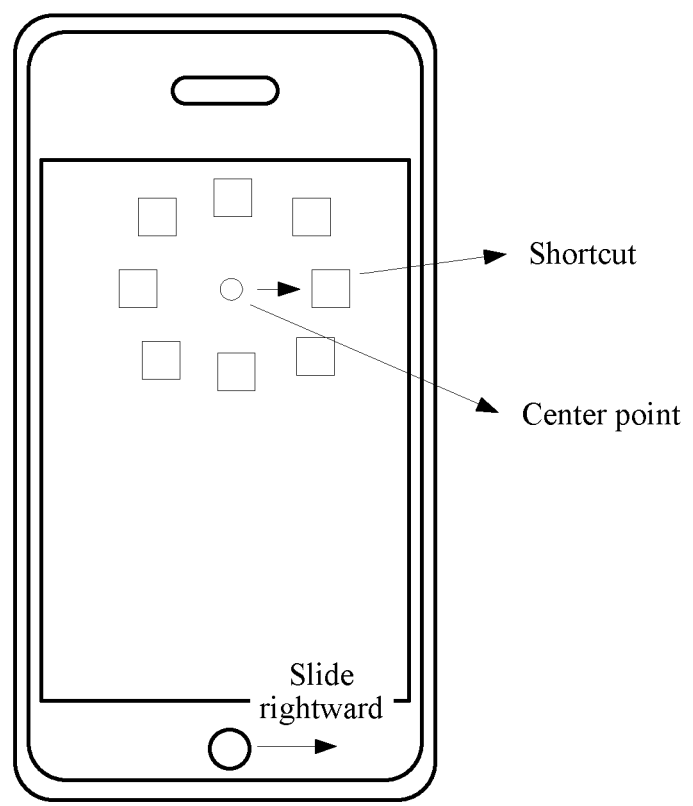
FIG. 5 is a schematic diagram of operating a mobile terminal according to an embodiment of the present disclosure.

Further, the sliding start point obtained by the fingerprint sensor may be mapped to a center point for shortcut arrangement. After the sliding direction of the sliding operation of the user is obtained, the center point may be used as a center, and a shortcut corresponding to the sliding direction on the fingerprint sensor is determined. For example, in FIG. 5, when the user slides rightward, a shortcut on a right side of the center point on the display screen is determined.

The operation vector may be further understood as a movement direction of the mobile terminal that is detected by a sensor. For example, displacement of the mobile terminal in X, Y, and Z three directions in three-dimensional space is detected by an acceleration sensor, a direction sensor, an electronic compass sensor, a gyro sensor, or the like in order to detect a movement displacement direction of the terminal. The direction sensor is used as an example (principles of the gyro sensor are the same). The direction sensor detects displacement of the terminal in the X, Y, and Z three directions in the three-dimensional space in order to detect movement displacement of the terminal. The X and Y directions are used to determine a direction on a horizontal plane, and the Z direction is used to determine a direction perpendicular to the horizontal plane. Displacement data obtained by the sensor by means of detection may be used as basic analysis data for a position information change of the terminal, and further provides data support about whether the terminal needs to perform signal measurement. For example, the direction sensor may obtain displacement in at least one direction of the X, Y, or Z direction, and when the terminal determines, using the sensor, that a continuous position change in the any direction meets a preset time threshold, an operation vector generated by operating the mobile terminal by the user is determined. For example, the mobile terminal may detect, using a gyroscope, an instruction of shaking a mobile phone by the user, and obtain a direction in which the user shakes the mobile phone. After a shortcut is presented according to a preset arrangement rule, a shortcut is determined according to information about the direction.

Step S304: Run a first shortcut in at least one shortcut according to the operation vector, and present a running result.

After obtaining the operation vector generated by operating the at least one operation component of the mobile terminal by the user, the terminal may determine the first shortcut according to the operation vector, and after determining the first shortcut, run the first shortcut, and present the running result of the first shortcut.

In an optional implementation, the operation vector is the operation direction of the user on the operation component, for example, a sliding direction of the user on the touchscreen or the fingerprint sensor. The terminal may perform operation mapping between an operation event on the touchscreen or the fingerprint sensor and an operation event on a coordinate point on the touchscreen. The operation event that is performed by the user on the fingerprint sensor or the touchscreen and that is detected by the terminal may be considered as a corresponding operation event performed by the user on the coordinate point. For example, the coordinate point may be a center point for presenting multiple shortcuts. For example, when it is detected that the user slides in a direction on the fingerprint sensor, a sliding operation that uses a corresponding coordinate point on the screen as a start point is performed, and sliding tracks may be the same or corresponding to each other. That the sliding tracks are the same or corresponding to each other includes sliding directions are the same or a deviation falls within a preset range, lengths of the sliding tracks are the same or similar according to a proportion, positions of coordinate points passed through by the sliding tracks are in a mapping relationship, or the like. For example, when it is detected that the user performs a double tap operation on the fingerprint sensor, a double tap operation that uses a corresponding coordinate point on the screen as a touch position is performed.

In an optional implementation, the operation vector is the movement direction of the mobile terminal that is detected by a sensor, for example, a movement direction detected by a gyroscope. The terminal may perform operation mapping between a displacement event of the terminal that is detected by the sensor and an operation event on a coordinate point on the touchscreen. The displacement event (which includes a displacement direction, a displacement acceleration, displacement duration, or the like) detected by the terminal may be considered as a corresponding operation event performed by the user on the coordinate point. For example, when it is detected that the terminal is moving forwards in a direction of a 90-degree angle on a Y axis, a shortcut right above a center point for shortcut arrangement on the screen is executed.

Running a first shortcut includes but is not limited to the following cases. When the first shortcut is an interface element (such as a contact profile picture) pointing to a contact, running a first shortcut is dialing a phone number of the contact, when the first shortcut is a task, running a first shortcut is executing the task, for example, enabling or disabling a process in a task manager, when the first shortcut is an entrance of an application program, for example, an icon of GOOGLE Maps, running a first shortcut is running GOOGLE Maps, when the first shortcut is a link of a file, for example, a word file, running a first shortcut is opening the word file, when the first shortcut is a link of a folder, running a first shortcut is unfolding the folder, or when the first shortcut is a link of an element in an application program, running a first shortcut is viewing the element in the program, for example, viewing a contact Zhang San or Li Si in a contact application, or is triggering the element in the program, for example, setting the terminal to a silent mode, or setting screen brightness of the terminal.

When the operation vector is an operation vector of the user on the fingerprint sensor, the terminal may map, to an operation event obtained by the terminal on the touchscreen, an operation event triggered by the user on the fingerprint sensor. For example, the user performs a sliding operation on the fingerprint sensor using an index finger, and a sliding operation event triggered by the sliding operation performed using the index finger may be mapped to a sliding operation performed on the touchscreen using the index finger. For example, the user performs a touch and hold operation on the fingerprint sensor using a thumb, and a touch and hold operation event triggered by the touch and hold operation performed using the thumb may be mapped to a touch and hold operation event performed on a coordinate point on the touchscreen using the thumb. For example, the user performs a double tap operation on the fingerprint sensor using a thumb, and a double tap operation event triggered by the double tap operation performed using the thumb may be mapped to a double tap operation event performed on a coordinate point on the touchscreen using the thumb.

In this embodiment of the present disclosure, a shortcut is presented by performing matching between fingerprint events, a to-be-run shortcut is determined according to an operation vector generated by operating a mobile terminal by a user, the shortcut is run, and a running result is presented such that the user can conveniently and quickly run the shortcut, thereby reducing operation duration, and improving operation efficiency. For example, in both a screen-off state and a screen-locked state, the user needs only to place a finger on a fingerprint sensor, and the mobile terminal performs fingerprint recognition, illuminates a screen, performs an unlocking operation, and presents a shortcut. After the user views the presented shortcut, the finger moves slightly at a position at which the finger originally stays, and a desired shortcut may be run. For the user, one action performed almost at one position enables the mobile terminal to perform fingerprint recognition, illuminate the screen, perform the unlocking operation, present multiple shortcuts, and run a shortcut selected by the user. That is, a fingerprint event is obtained at a first position on the mobile terminal, and similarly, an operation vector generated by operating an operation component by the user starting from the first position is obtained at the first position.

Figure 6:
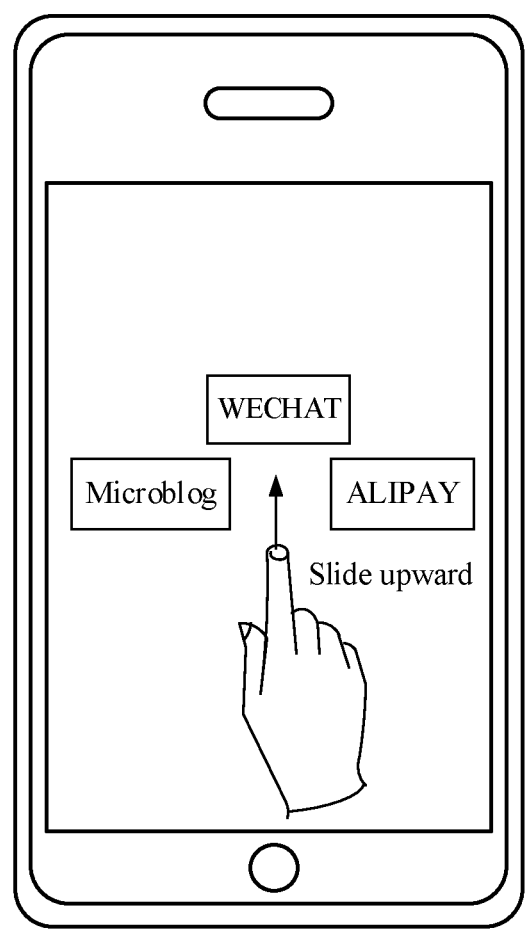
FIG. 6 is a schematic diagram of operating a mobile terminal according to an embodiment of the present disclosure.

As shown in FIG. 6, FIG. 6 is a schematic diagram of operating a mobile terminal according to an embodiment of the present disclosure. In this embodiment of the present disclosure, a fingerprint sensor of the mobile terminal is a touchscreen. A user operation is used as an example. The mobile terminal is currently in a screen-on state and presents a screen-locked interface. The touchscreen of the mobile terminal obtains a touch of an index finger of a user, and determines that a fingerprint of the index finger matches a preset fingerprint event. A specific interface is presented. Multiple application icons are presented on the specific interface, for example, a WECHAT icon, a microblog icon, and an ALIPAY icon. In this process, the mobile terminal continuously detects pressure from the index finger of the user, and a coordinate position pressed by the index finger of the user keeps unchanged. After the multiple icons are presented, the mobile terminal obtains a sliding track that is entered by the user and that is obtained by sliding in an upward vertical direction using a point pressed by the index finger as a start point, determines, according to the sliding track, that a current operation vector is the upward vertical direction, for example, determines, by means of calculation using a coordinate point on the touchscreen, that the current operation vector is the upward vertical direction, determines a shortcut in the upward vertical direction, for example, the WECHAT icon, runs the WECHAT icon, and presents an interface on which a WECHAT application is run.

Figure 7:
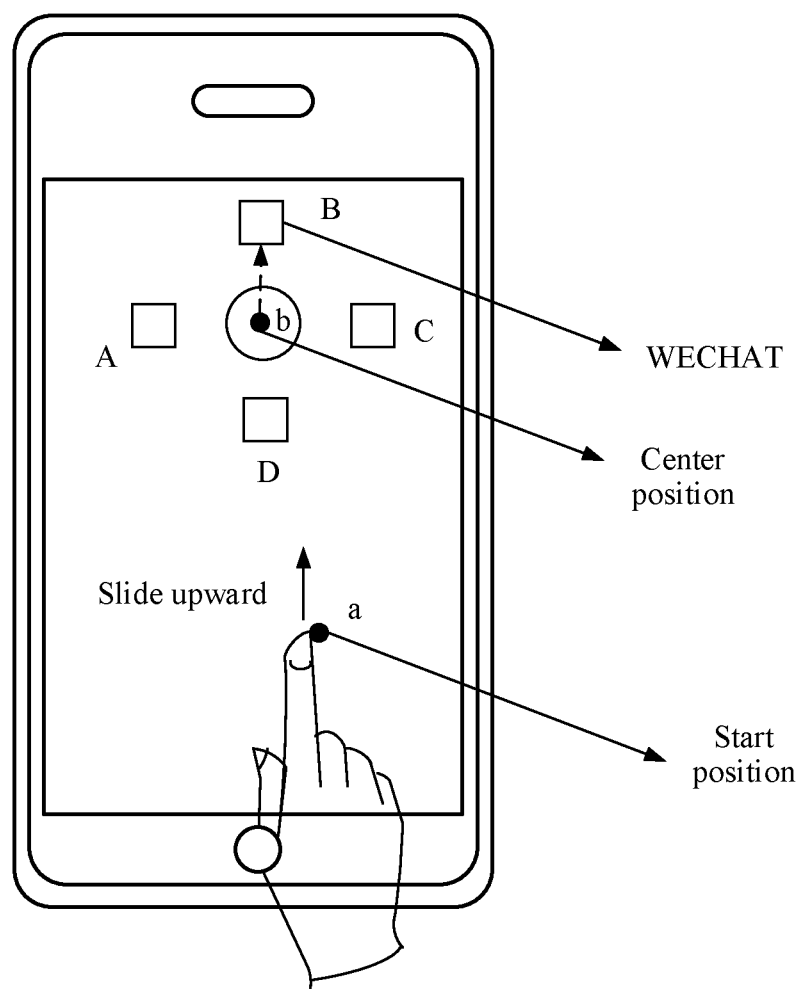
FIG. 7 is a schematic diagram of operating a mobile terminal according to an embodiment of the present disclosure.

As shown in FIG. 7, FIG. 7 is a schematic diagram of operating a mobile terminal according to an embodiment of the present disclosure. In this embodiment of the present disclosure, a fingerprint sensor of the mobile terminal is a touchscreen. A user operation is used as an example. The mobile terminal is currently in a screen-off state, and a user touches a physical button to illuminate a screen, or a user taps the touchscreen to illuminate a screen. After the touchscreen of the terminal is powered on, a screen-locked interface is presented. The touchscreen of the terminal obtains a touch of an index finger of the user, and determines that a fingerprint of the index finger matches a preset fingerprint event. A specific interface is presented. Multiple application icons are presented on the specific interface, for example, a microblog icon A, a WECHAT icon B, an ALIPAY icon C, and a QQ icon D. The four icons may be arranged in a ring shape using a preset center position b as a center. In this process, the mobile terminal does not detect pressure from the index finger of the user, that is, after entering the fingerprint of the index finger, the user removes the finger from the touchscreen. After the multiple icons are presented, the terminal obtains a sliding track that is entered by the user and that is obtained by sliding in an upward vertical direction using any point a on the touchscreen as a start position. The mobile terminal maps the start position of the sliding track to the center position, determines, according to the sliding track, that a current operation vector is the upward vertical direction, determines a shortcut in the upward vertical direction, for example, the WECHAT icon, runs the WECHAT icon, and presents an interface on which a WECHAT application is run.

Figure 8:
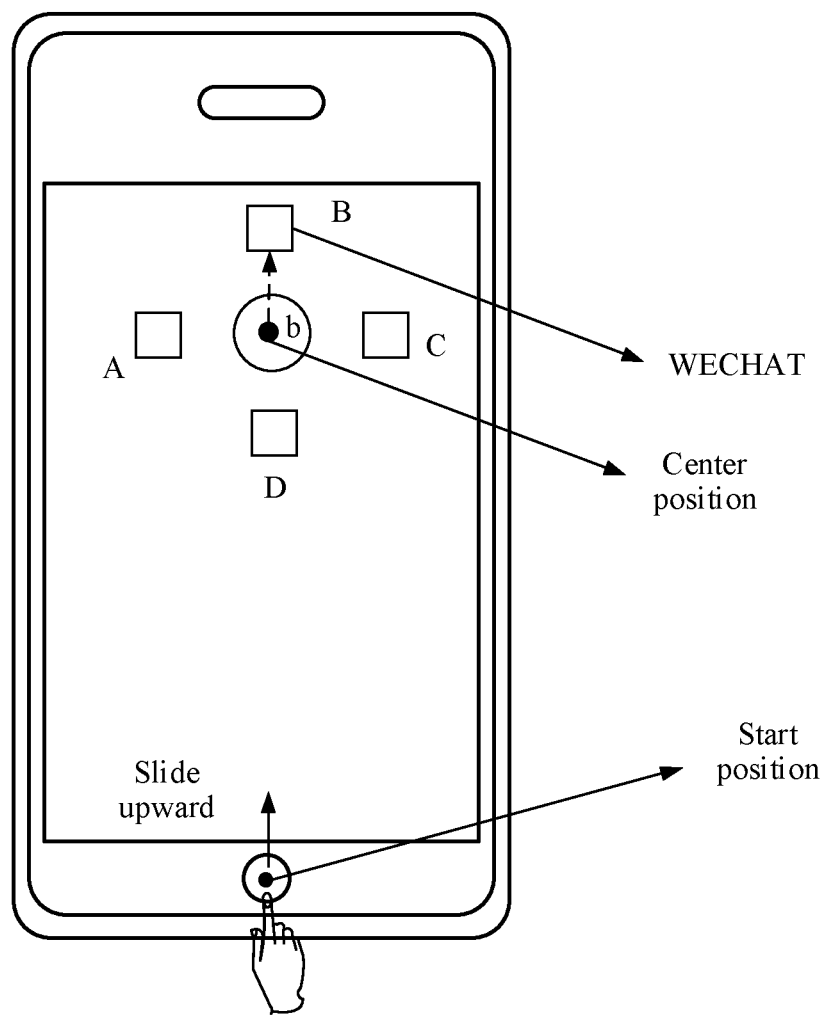
FIG. 8 is a schematic diagram of operating a mobile terminal according to an embodiment of the present disclosure.

As shown in FIG. 8, FIG. 8 is a schematic diagram of operating a mobile terminal according to an embodiment of the present disclosure. In this embodiment of the present disclosure, a fingerprint sensor of the mobile terminal is disposed at a lower part of a touchscreen. The mobile terminal may be currently in a screen-off state, or in a screen-on state, or in a screen-locked state. The fingerprint sensor obtains a touch of an index finger of a user, and determines that a fingerprint of the index finger matches a preset fingerprint event. A specific interface is presented. Multiple application icons are presented on the specific interface, for example, a microblog icon A, a WECHAT icon B, an ALIPAY icon C, and a QQ icon D. The four icons may be arranged in a ring shape using a preset center position b as a center. In this process, the fingerprint sensor continuously detects pressure from the index finger of the user. After the multiple icons are presented, the fingerprint sensor continuously collects a fingerprint image of the index finger of the user, and determines, according to multiple images in an index finger fingerprint model that are stored in the mobile terminal, that the index finger of the user moves. A processor determines a sliding direction of the index finger on the fingerprint sensor according to the multiple stored fingerprint images of the index finger and multiple fingerprint images continuously collected by the fingerprint sensor. For example, the index finger slides in an upward vertical direction. The terminal maps, to the center position, a start position at which the index finger slides on the fingerprint sensor, determines a shortcut in the upward vertical direction of the center position according to the sliding direction, for example, the WECHAT icon, runs the WECHAT icon, and presents an interface on which a WECHAT application is run.

Figure 9:
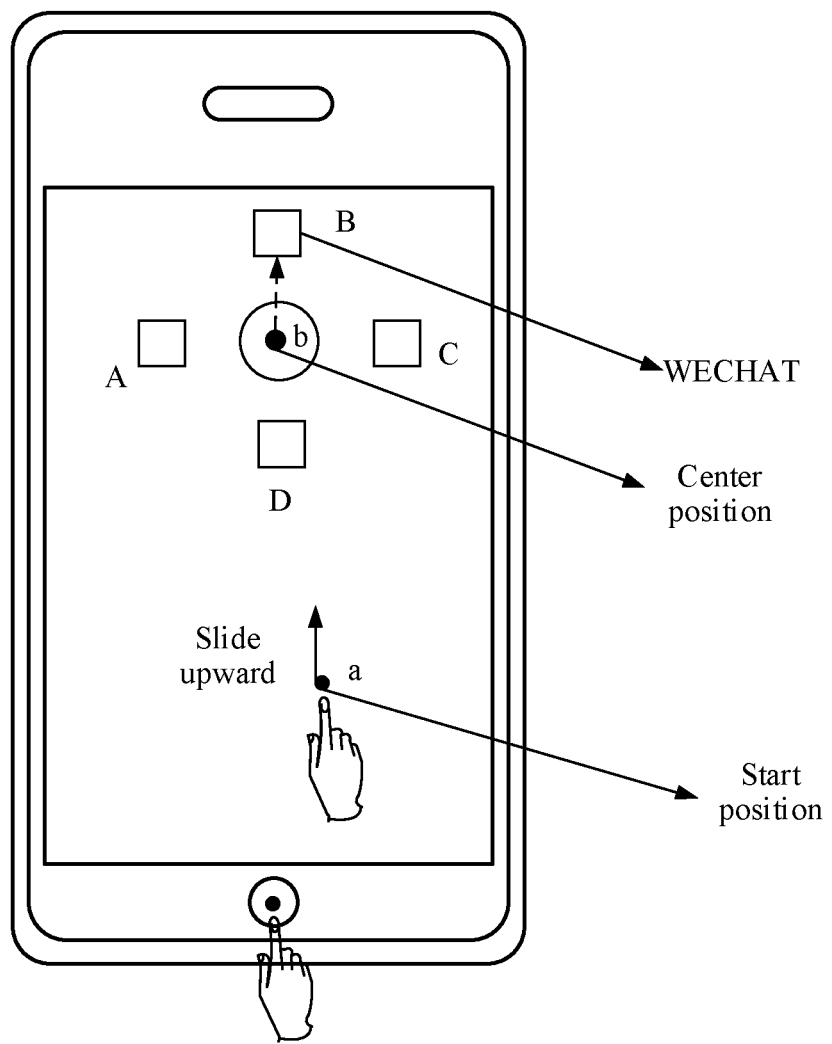
FIG. 9 is a schematic diagram of operating a mobile terminal according to an embodiment of the present disclosure.

As shown in FIG. 9, FIG. 9 is a schematic diagram of operating a mobile terminal according to an embodiment of the present disclosure. In this embodiment of the present disclosure, a fingerprint sensor of the terminal is disposed at a lower part of a touchscreen. The mobile terminal may be currently in a screen-off state, or in a screen-on state, or in a screen-locked state. The fingerprint sensor obtains a touch of an index finger of a user, and determines that a fingerprint of the index finger matches a preset fingerprint event. A specific interface is presented. Multiple application icons are presented on the specific interface, for example, a microblog icon A, a WECHAT icon B, an ALIPAY icon C, and a QQ icon D. The four icons may be arranged in a ring shape using a preset center position b as a center. In this process, the fingerprint sensor does not detect continuous pressure from the index finger of the user, that is, after entering the fingerprint of the index finger on the fingerprint sensor, the user removes the fingerprint of the index finger from the fingerprint sensor. After the multiple icons are presented, the terminal obtains a sliding track that is entered by the user and that is obtained by sliding in an upward vertical direction using any point on the touchscreen as a start point. The mobile terminal maps a start position a of the sliding track to the center position, determines, according to the sliding track, that a current operation vector is the upward vertical direction, determines a shortcut in the upward vertical direction, for example, the WECHAT icon, runs the WECHAT icon, and presents an interface on which a WECHAT application is run.

In an embodiment of the present disclosure, the fingerprint sensor of the mobile terminal is a touchscreen. In a screen-off state, the touchscreen obtains a touch operation of an index finger of a user, or obtains a fingerprint of an index finger of a user. The touchscreen is powered on, a screen is illuminated, and a screen-locked interface is presented. A touch position of the index finger of the user keeps unchanged, and a current position on the touchscreen is continuously pressed. The touchscreen obtains the fingerprint of the index finger, performs identity authentication, and performs an unlocking operation. After the mobile terminal presents an interface that is after the unlocking, the touch position of the index finger of the user still keeps unchanged, and the current position on the touchscreen is continuously pressed. The touchscreen obtains the fingerprint of the index finger, compares the fingerprint with a pre-stored fingerprint event, and presents several shortcuts on the interface that is after the unlocking, for example, a microblog icon A and a WECHAT icon B, or for another example, a phone number of a contact A and a phone number of a contact B. The terminal obtains a sliding operation of the index finger on the touchscreen, obtains a sliding direction, determines a shortcut according to the sliding direction, and runs the shortcut, for example, opens a microblog application or a WECHAT application, or for another example, calls the contact A or calls the contact B.

In an optional embodiment, different fingerprints may be corresponding to different shortcuts. Further, the terminal may pre-store a correspondence between different fingerprints and different shortcuts. One type of fingerprint corresponds to one type of shortcut, for example, an index finger of a user corresponds to a shortcut of a communication-type application, and a middle finger corresponds to a shortcut of a game-type application. The type herein may be obtained by classification by the user, or may be original category information carried when the user downloads an ANDROID package kit (APK) of an application. Alternatively, one type of fingerprint may be corresponding to a shortcut obtained by means of screening according to a screening rule. For example, an index finger of a user corresponds to shortcuts of a specific quantity of applications frequently tapped by the user within a time period, for example, shortcuts of five applications frequently run by the user within the last week. A middle finger corresponds to shortcuts of a specific quantity of applications that are possibly used in a current environment by performing determining according to current environment parameter information. For example, if it is determined, according to the current environment parameter information, that the user is outdoors, applications such as a weather-type application and a traffic-type application may be used. Different fingerprints are corresponding to different shortcuts such that a user can perform different settings according to a use habit of the user in order to diversify shortcut selection, and facilitate a user operation.

In an optional embodiment, different fingerprints may be corresponding to different shortcut arrangement. Further, the terminal may pre-store a correspondence between different fingerprints and different shortcut arrangement rules. The arrangement rule may include at least one of a shortcut quantity rule, a shortcut arrangement pattern rule, a shortcut arrangement position rule, a shortcut arrangement spacing rule, or the like. The shortcut quantity rule is a quantity of shortcuts. For example, the quantity of shortcuts may be a quantity of shortcuts of all applications whose use frequencies within a time period exceed a specific value, for example, a quantity of shortcuts of applications that are used more than ten times within one day, may be a quantity of shortcuts of applications presented according to a specific proportion, for example, a quantity of shortcuts of the first five applications that are most frequently used, or may be a fixed value such as five times. The fixed value may be preset by a system, or may be defined by a user. The shortcut arrangement pattern rule is a shortcut arrangement form. For example, a coordinate point on a touchscreen is used as a center. As shown in FIG. 4, shortcuts are arranged around the coordinate point in a cellular shape, arranged in a rectangle shape, or arranged in a pattern defined by the user. The shortcut arrangement position rule defines a position at which a shortcut is presented on a screen. For example, shortcuts are arranged using a position of a center point on the screen as a center. Whether the user holds the terminal using a left hand or a right hand may be further determined according to a handheld status of the user, and when the user holds the terminal using the left hand, the terminal may intelligently adjust a shortcut arrangement position. Determining whether the terminal is held using the left hand or the right hand belongs to the other approaches in the field, and details are not further described herein. The shortcut arrangement spacing rule means a mutual spacing between multiple shortcuts. For example, eight shortcuts are presented by default by the system. The shortcuts are arranged in a circle whose radius is 0.5 centimeter, or arranged in a circle whose radius is 1 centimeter. The specific rules may be combined with each other for application, and the rules may be set by the user, or may be preset by the system. Different fingerprints are corresponding to different shortcut arrangement rules such that a user can set, according to a use habit of the user, an arrangement form that the user is fond of, thereby implementing customization, and improving user experience.

In a possible implementation, after obtaining a fingerprint gesture or a fingerprint, the fingerprint sensor of the terminal determines whether the fingerprint gesture matches a preset fingerprint gesture, or determines whether the fingerprint matches a preset fingerprint. When the fingerprint gesture matches the preset fingerprint gesture, or the fingerprint matches the preset fingerprint, any coordinate point on a screen of the terminal is obtained, the coordinate point is used as a center, and corresponding shortcuts are presented around the coordinate point in a preset arrangement manner. A sliding operation of a user at any point on a touchscreen is obtained, and the sliding operation of the user at the any point on the touchscreen is mapped to a sliding operation that uses the coordinate point as a start point. After obtaining the sliding operation that uses the coordinate point as the start point, the terminal obtains a sliding direction of the sliding operation, and runs a shortcut corresponding to the sliding direction. In this way, after a terminal authenticates a fingerprint, and presents a shortcut, a user no longer needs to tap a shortcut at a specific position to run the shortcut, thereby improving convenience of a user operation.

In a possible implementation, when the fingerprint gesture matches the preset fingerprint gesture, or the fingerprint matches the preset fingerprint, the terminal may further determine, using a sensor, whether the user holds the terminal using a left hand or a right hand in order to determine whether the user currently operates the terminal using the left hand or the right hand. Further, a shortcut arrangement rule such as an arrangement position or an arrangement pattern is determined according to whether the user operates the terminal using the left hand or the right hand. For example, when the user operates the terminal using the right hand, shortcuts may be presented in a sector shape in a lower right corner on the display screen of the terminal such that the user can quickly and conveniently select a shortcut, thereby improving use convenience of the user.

In a possible implementation, after obtaining a fingerprint gesture or a fingerprint, the fingerprint sensor of the terminal determines whether the fingerprint gesture matches a preset fingerprint gesture, or determines whether the fingerprint matches a preset fingerprint. When the fingerprint gesture matches the preset fingerprint gesture, or the fingerprint matches the preset fingerprint, any coordinate point on a screen of the terminal is obtained, the coordinate point is used as a center, and corresponding shortcuts are presented around the coordinate point in a preset arrangement manner. A sliding operation of a user on the fingerprint sensor is obtained, and the sliding operation of the user on the fingerprint sensor is mapped to a sliding operation that uses the coordinate point as a start point. After obtaining the sliding operation that uses the coordinate point as the start point, the terminal obtains a sliding direction of the sliding operation, and runs a shortcut corresponding to the sliding direction. In this way, a user can select and run a shortcut only by operating a fingerprint sensor, and the user does not need to tap a touchscreen for selection after determining the shortcut, thereby greatly improving touch efficiency.

During actual product implementation, the following scenario may occur. The fingerprint sensor of the terminal has a relatively small touch area, and a sliding direction cannot be accurately detected. In a possible implementation, after fingerprint gesture recognition or fingerprint recognition is performed, and a shortcut is presented on a display screen, a touchscreen or any other touch component of the terminal may be further used to determine a direction of an operation vector of an operation performed by a user on a screen or the operation component in order to determine a shortcut. For example, after a fingerprint component on the back of Mate 7 recognizes a fingerprint gesture of an index finger or a middle finger, a shortcut is displayed. When a thumb slides in a direction on the screen, a shortcut in the corresponding direction is selected and executed. The thumb may operate at any position on the screen, and the terminal needs only to determine direction information of an operation vector, and determines a shortcut according to the direction information.

During product implementation, a scenario in which the terminal is in a screen-locked state may further occur. In a possible implementation, when a fingerprint gesture or a fingerprint is used to present a shortcut, the fingerprint gesture or the fingerprint may be further used for unlocking. That is, when the terminal is in the screen-locked state, that is, when the terminal currently presents a screen-locked interface, the terminal obtains a fingerprint event that is entered by a user using the fingerprint sensor. When the fingerprint event matches a preset fingerprint event, the terminal performs an unlocking operation, and presents a corresponding shortcut on an interface presented on a display screen after the unlocking. In a possible implementation, if a fingerprint gesture or a fingerprint cannot be used for unlocking, in the screen-locked state, the terminal obtains an unlocking instruction that is entered by the user, and terminates the screen-locked state according to the unlocking instruction. The terminal obtains a fingerprint gesture or a fingerprint that is entered by the user, attempts to authenticate the fingerprint gesture or the fingerprint, and presents a corresponding shortcut when the authentication succeeds. Alternatively, in a possible implementation, when a fingerprint gesture or a fingerprint is used to present a shortcut, the fingerprint gesture or the fingerprint is not used for unlocking. Instead, after an operation vector generated by triggering an operation component by the user is obtained, unlocking is performed such that the terminal can run, on a screen that is after the unlocking, a shortcut corresponding to the operation vector, and can further present a running result. Alternatively, in a possible implementation, an unlocked state may be entered only when a running result of a shortcut corresponding to an operation vector is finally presented. That is, the terminal is still in the screen-locked state when the shortcut is run, and when the running result of the shortcut is presented, the terminal is in the unlocked state. Certainly, in a possible implementation, a running result of a shortcut corresponding to an operation vector may be presented on a screen-locked interface. This is not limited. A screen-locked interface of a terminal is considered such that the terminal learns of a requirement of a user in a timely manner, thereby improving convenience of operating the terminal in different states, and improving user experience.

During product implementation, a scenario in which the terminal is in a screen-off state may further occur. In a possible implementation, the terminal is in a state in which a screen is off and the screen is not locked. In the screen-off state, the terminal obtains a fingerprint gesture or a fingerprint that is entered by a user, illuminates a screen, attempts to determine, by means of authentication, whether the fingerprint gesture or the fingerprint matches a preset fingerprint event, and when an authentication result is that the fingerprint gesture or the fingerprint matches the preset fingerprint event, presents a corresponding shortcut on a current interface. In a possible implementation, the terminal is in both a screen-off state and a screen-locked state. In this case, a fingerprint gesture or a fingerprint may be used to invoke a shortcut, and may be further used for unlocking. That is, in the screen-off state, the terminal obtains a fingerprint gesture or a fingerprint that is entered by a user. The terminal illuminates a screen, and attempts to determine, by means of authentication, whether the fingerprint gesture or the fingerprint matches a preset fingerprint event. When an authentication result is that the fingerprint gesture or the fingerprint matches the preset fingerprint event, the terminal performs an unlocking operation, and presents a corresponding shortcut on an interface presented on a display screen after the unlocking. It should be noted that, operations of illuminating the screen and performing authentication by the terminal may be simultaneously performed, or may be performed in a sequence according to a requirement. From a perspective of user perception, after a fingerprint event is entered, the terminal may first illuminate the screen, present a screen-locked interface, then display the interface that is after the unlocking, and further present a corresponding shortcut on the interface that is after the unlocking.

In an embodiment of the present disclosure, in the method shown in FIG. 3, the method further includes presenting a screen-locked interface when the fingerprint event that is entered by the user does not match the preset fingerprint event, where at least one shortcut is presented on the screen-locked interface, obtaining a sliding direction of the user on the fingerprint sensor, determining, according to the sliding direction of the user on the fingerprint sensor, a second shortcut in the at least one shortcut presented on the screen-locked interface, and running the second shortcut, and presenting a running result. An example that the second shortcut is an icon of a camera application is used. If the preset fingerprint event is a fingerprint of an index finger, and the fingerprint that is entered by the user is a fingerprint of a thumb, in this case, the terminal determines, by means of authentication, that the preset fingerprint event and the fingerprint event that is entered by the user do not match, and presents the screen-locked interface. A shortcut of the camera application is presented on the screen-locked interface. For example, the camera application is presented in a lower right corner on the current display screen of the terminal. A sliding operation of the user on the fingerprint sensor is obtained. The sliding operation may be performed using any finger, or may be performed using only a preset fingerprint. When the sliding operation of the user on the fingerprint sensor is an upward sliding operation, the camera application is run, and a viewfinder is presented. In this embodiment, a shortcut is presented on a screen-locked interface such that a user can open a corresponding shortcut by performing a sliding operation on a fingerprint sensor, and the user can quickly and conveniently run the shortcut without moving a finger to a touchscreen to perform an operation, thereby reducing operation duration, and improving operation efficiency.

In an embodiment of the present disclosure, as shown in FIG. 1, this embodiment of the present disclosure further provides a mobile terminal. The mobile terminal may be used to execute the method shown in FIG. 3 or any method procedure in the method embodiment. For a same or corresponding technical feature thereof, refer to description in the method embodiment. The mobile terminal includes an input device 102 configured to obtain a fingerprint event that is entered by a user, an output device 105 configured to present at least one shortcut if the fingerprint event that is entered by the user matches a preset fingerprint event, at least one operation component 104 configured to obtain an operation vector entered by operating the mobile terminal by the user, and a processor 101 configured to run a first shortcut in the at least one shortcut according to the operation vector. The output device 105 is further configured to present a running result after the processor 101 runs the first shortcut. Optionally, the output device 105 may be a display screen, or may be a projector that has a projecting function. It should be noted that, the operation component 104 and the input device 102 herein are only a general reference. During actual product implementation, the operation component 104 and the input device 102 may be a same device. For example, both the operation component 104 and the input device 102 are a fingerprint sensor. The operation component 104 and the input device 102 may be different devices. For example, the input device 102 is a fingerprint sensor, and the operation component 104 is a touchscreen. The mobile terminal further includes a power supply 106 configured to supply power to the mobile terminal, and further includes a memory 103 configured to store corresponding code or the like for the mobile terminal. In this embodiment of the present disclosure, a shortcut is presented by performing matching between fingerprint events, a to-be-run shortcut is determined according to an operation vector generated by operating a mobile terminal by a user, the shortcut is run, and a running result is presented such that the user can conveniently and quickly run the shortcut, thereby reducing operation duration, and improving operation efficiency.

In the embodiment of the mobile terminal, the at least one operation component 104 may be a fingerprint sensor. That the at least one operation component 104 is configured to obtain an operation vector entered by operating the mobile terminal by the user includes that the fingerprint sensor is configured to obtain a sliding direction of the user on the fingerprint sensor. The processor 101 is further configured to determine the first shortcut in the at least one shortcut according to the sliding direction of the user on the fingerprint sensor, and run the first shortcut.

In the embodiment of the mobile terminal, the at least one operation component may be a touchscreen. That the at least one operation component is configured to obtain an operation vector entered by operating the mobile terminal by the user includes that the touchscreen is configured to obtain a sliding direction of the user on the touchscreen. The processor 101 is further configured to determine the first shortcut in the at least one shortcut according to the sliding direction of the user on the touchscreen, and run the first shortcut.

In the embodiment of the mobile terminal, optionally, the output device 105 is further configured to present a screen-locked interface before the input device obtains the fingerprint event that is entered by the user. The processor 101 is further configured to perform an unlocking operation if the fingerprint event that is entered by the user matches the preset fingerprint event. The output device 105 is further configured to present the at least one shortcut after the processor 101 performs the unlocking operation.

In the embodiment of the mobile terminal, optionally, the output device 105 is further configured to present a screen-locked interface before the input device 102 obtains the fingerprint event that is entered by the user. The output device 105 is further configured to present the at least one shortcut on the screen-locked interface if the fingerprint event that is entered by the user matches the preset fingerprint event. The output device 105 is further configured to present the running result on the screen-locked interface after the processor 101 runs the first shortcut in the at least one shortcut.

In the embodiment of the mobile terminal, optionally, the output device 105 is further configured to present a screen-off state before the input device 102 obtains the fingerprint event of the user. The output device 105 is further configured to perform a power-on operation, illuminate a screen, and present the at least one shortcut if the fingerprint event that is entered by the user matches the preset fingerprint event.

In the embodiment of the mobile terminal, the input device 102 is a fingerprint sensor. The output device 105 is further configured to present a screen-locked interface if the fingerprint event that is entered by the user does not match the preset fingerprint event, where at least one shortcut is presented on the screen-locked interface. The fingerprint sensor is further configured to obtain a sliding direction of the user on the fingerprint sensor after the output device presents the screen-locked interface. The processor 101 is further configured to determine, according to the sliding direction of the user on the fingerprint sensor, a second shortcut in the at least one shortcut presented on the screen-locked interface, and run the second shortcut. The output device 105 is further configured to present a running result after the processor 105 runs the second shortcut.

In the mobile terminal embodiment, that the output device 105 presents at least one shortcut includes that the output device 105 presents the at least one shortcut in a preset region on a currently presented first interface according to a preset arrangement rule, the output device 105 performs a switchover from a first interface to a second interface, and presents the at least one shortcut in a preset region on the second interface according to a preset arrangement rule, where the first interface is a currently presented interface of the output device 105, or the output device 105 presents a suspend interface on a currently presented first interface, and presents the at least one shortcut on the suspend interface according to a preset arrangement rule.

In the embodiment of the mobile terminal, the output device 105 is further configured to present a screen-locked interface after presenting the at least one shortcut, if the at least one operation component does not obtain, within preset duration, the operation vector entered by operating the mobile terminal by the user. Alternatively, the output device 105 is further configured to present a system application interface after presenting the at least one shortcut, if the at least one operation component does not obtain, within preset duration, the operation vector entered by operating the mobile terminal by the user.

In the embodiment of the mobile terminal, the input device 102 includes a fingerprint sensor. That the input device 102 obtains a fingerprint event that is entered by a user includes the fingerprint sensor obtains a fingerprint that is entered by the user, the fingerprint sensor obtains a first fingerprint gesture that is entered by the user, where the first fingerprint gesture is at least one of a tap operation, a double tap operation, a touch and hold operation, or a sliding operation that is performed by the user on the fingerprint sensor using a specific fingerprint, or the input device 102 obtains a second fingerprint gesture that is entered by the user, where the second fingerprint gesture is a combination of an operation generated by triggering the fingerprint sensor by the user using a specific fingerprint and an operation generated by triggering another operation component by the user.

In the embodiment of the mobile terminal, different fingerprint events are corresponding to different shortcuts.

In the embodiment of the mobile terminal, the output device 105 is further configured to present the at least one shortcut according to the preset arrangement rule, and different fingerprint events are corresponding to different shortcut arrangement rules. The arrangement rule includes at least one of a shortcut quantity rule, a shortcut arrangement pattern rule, a shortcut arrangement position rule, or a shortcut arrangement spacing rule.

In the embodiment of the mobile terminal, the shortcut displayed by the output device 105 includes at least one of a shortcut of an application program, a shortcut of a specific function, or a shortcut of an internal element of a specific application.

Figure 11:
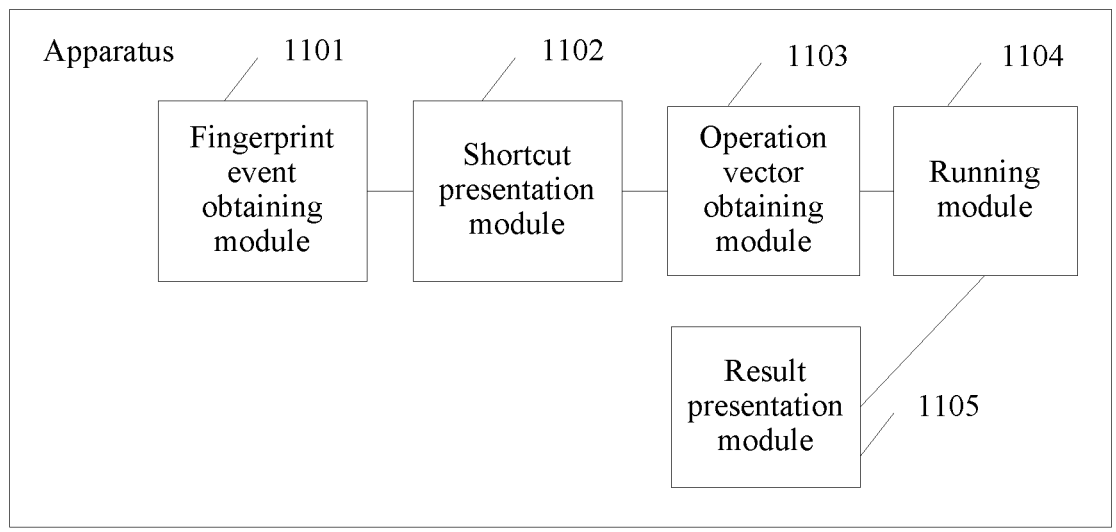
FIG. 11 is a schematic structural diagram of an apparatus according to an embodiment of the present disclosure.

In an embodiment of the present disclosure, as shown in FIG. 11, this embodiment of the present disclosure further provides an apparatus. The apparatus may be used to execute the method shown in FIG. 3 or any method procedure in the method embodiment. For a same or corresponding technical feature thereof, refer to description in the method embodiment. The apparatus includes a fingerprint event obtaining module 1101 configured to obtain a fingerprint event that is entered by a user, a shortcut presentation module 1102 configured to present at least one shortcut if the fingerprint event that is entered by the user matches a preset fingerprint event, an operation vector obtaining module 1103 configured to obtain an operation vector generated by operating at least one operation component of a mobile terminal by the user, a running module 1104 configured to run a first shortcut in the at least one shortcut according to the operation vector, and a result presentation module 1105 configured to present a running result after the running module 1104 runs the first shortcut. In this embodiment of the present disclosure, a shortcut is presented by performing matching between fingerprint events, a to-be-run shortcut is determined according to an operation vector generated by operating a mobile terminal by a user, the shortcut is run, and a running result is presented such that the user can conveniently and quickly run the shortcut, thereby reducing operation duration, and improving operation efficiency.

In the embodiment of the mobile terminal, the at least one operation component is a fingerprint sensor. The operation vector obtaining module 1103 is further configured to obtain a sliding direction of the user on the fingerprint sensor. The running module 1104 is further configured to determine the first shortcut in the at least one shortcut according to the sliding direction of the user on the fingerprint sensor, and run the first shortcut.

In the embodiment of the mobile terminal, the at least one operation component is a touchscreen. The operation vector obtaining module 1103 is further configured to obtain a sliding direction of the user on the touchscreen. The running module 1104 is further configured to determine the first shortcut in the at least one shortcut according to the sliding direction of the user on the touchscreen, and run the first shortcut.

In the embodiment of the mobile terminal, optionally, the apparatus further includes a first screen-locked presentation module (not shown). The first screen-locked presentation module is configured to present a screen-locked interface before the fingerprint event obtaining module 1101 obtains the fingerprint event that is entered by the user. The shortcut presentation module 1102 is further configured to perform an unlocking operation if the fingerprint event that is entered by the user matches the preset fingerprint event, and present the at least one shortcut according to a preset arrangement rule after the unlocking.

In the embodiment of the mobile terminal, optionally, the apparatus further includes a second screen-locked presentation module (not shown). The second screen-locked presentation module is configured to present a screen-locked interface before the fingerprint event obtaining module 1101 obtains the fingerprint event that is entered by the user. The shortcut presentation module 1102 is further configured to present the at least one shortcut on the screen-locked interface if the fingerprint event that is entered by the user matches the preset fingerprint event. The result presentation module 1105 is further configured to present the running result on the screen-locked interface after the running module 1104 runs the first shortcut in the at least one shortcut. Alternatively, the result presentation module 1105 is further configured to present the running result in an unlocked state after the running module 1104 runs the first shortcut in the at least one shortcut.

In the embodiment of the mobile terminal, optionally, the apparatus further includes a screen-off control module (not shown). The screen-off control module is configured to enable the mobile terminal to present a screen-off state before the fingerprint event obtaining module 1101 obtains the fingerprint event that is entered by the user. The shortcut presentation module 1102 is further configured to illuminate a screen, and present the at least one shortcut if the fingerprint event that is entered by the user matches the preset fingerprint event.

In the embodiment of the mobile terminal, the apparatus further includes a third screen-locked presentation module (not shown) configured to present a screen-locked interface if the fingerprint event that is entered by the user does not match the preset fingerprint event, where at least one shortcut is presented on the screen-locked interface. The operation vector obtaining module 1103 is further configured to obtain a sliding direction of the user on a fingerprint sensor. The running module 1104 is further configured to determine, according to the sliding direction of the user on the fingerprint sensor, a second shortcut in the at least one shortcut presented on the screen-locked interface, and run the second shortcut. The result presentation module 1105 is further configured to present a running result after the running module 1104 runs the second shortcut.

In the embodiment of the mobile terminal, the shortcut presentation module 1102 presents at least one shortcut includes that the shortcut presentation module 1102 presents the at least one shortcut in a preset region on a currently presented first interface according to a preset arrangement rule, the shortcut presentation module 1102 performs a switchover from a first interface to a second interface, and presents the at least one shortcut in a preset region on the second interface according to a preset arrangement rule, where the first interface is a currently presented interface, or the shortcut presentation module 1102 presents a suspend interface on a currently presented first interface, and presents the at least one shortcut on the suspend interface according to a preset arrangement rule.

In the embodiment of the mobile terminal, the apparatus further includes a timing presentation module (not shown). The timing presentation module is configured to present a screen-locked interface after the shortcut presentation module 1102 presents the at least one shortcut, when the operation vector generated by operating the at least one operation component of the mobile terminal by the user is not obtained within preset duration. Alternatively, the timing presentation module is configured to present a system application interface after the shortcut presentation module 1102 presents the at least one shortcut, when the operation vector generated by operating the at least one operation component of the mobile terminal by the user is not obtained within preset duration.

In the embodiment of the mobile terminal, the fingerprint event obtaining module 1101 is further configured to obtain a fingerprint that is entered by the user. Alternatively, the fingerprint event obtaining module 1101 is further configured to obtain a first fingerprint gesture that is entered by the user, where the first fingerprint gesture is at least one of a tap operation, a double tap operation, a touch and hold operation, or a sliding operation that is performed by the user on the fingerprint sensor using a specific fingerprint. Alternatively, the fingerprint event obtaining module 1101 is further configured to obtain a second fingerprint gesture that is entered by the user, where the second fingerprint gesture is a combination of an operation generated by triggering the fingerprint sensor by the user using a specific fingerprint and an operation generated by triggering another operation component by the user.

In the embodiment of the mobile terminal, different fingerprint events obtained by the fingerprint event obtaining module 1101 are corresponding to different shortcuts.

In the embodiment of the mobile terminal, the shortcut presentation module 1102 is further configured to present the at least one shortcut according to the preset arrangement rule, and different fingerprint events obtained by the fingerprint event obtaining module 1101 are corresponding to different shortcut arrangement rules. The arrangement rule includes at least one of a shortcut quantity rule, a shortcut arrangement pattern rule, a shortcut arrangement position rule, or a shortcut arrangement spacing rule.

In the embodiment of the mobile terminal, the shortcut presented by the shortcut presentation module 1102 includes at least one of a shortcut of an application program, a shortcut of a specific function, or a shortcut of an internal element of a specific application.

Figure 12:
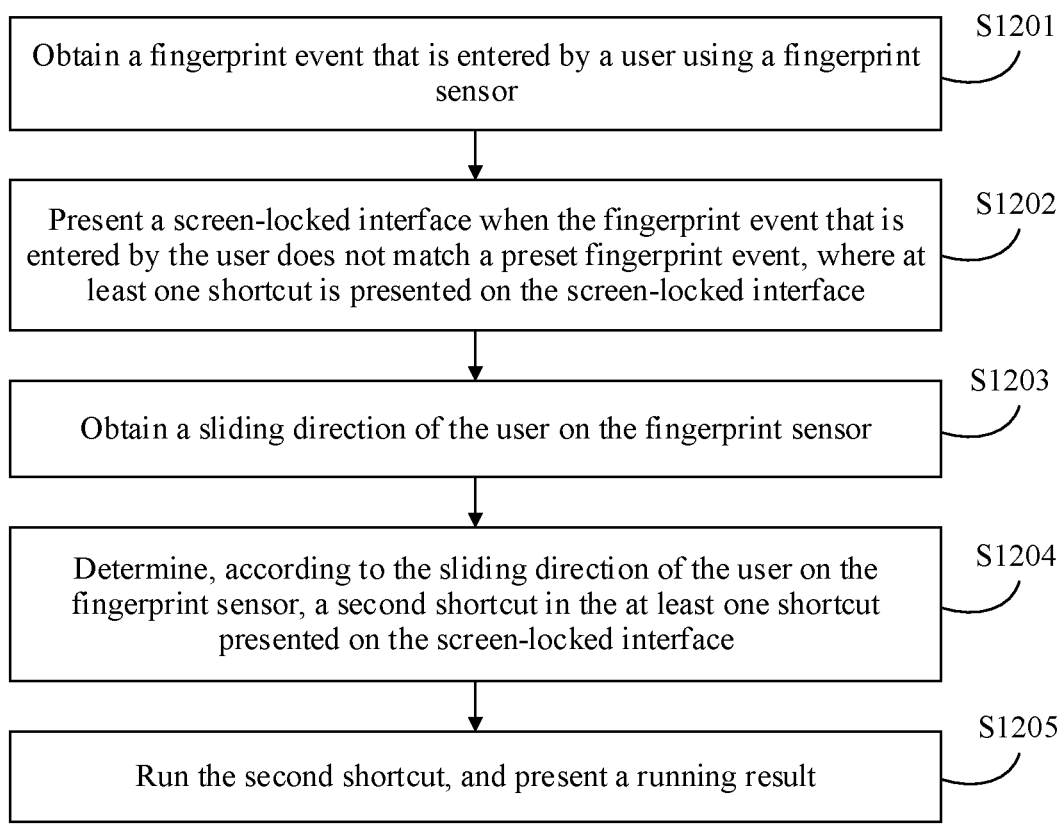
FIG. 12 is a flowchart of an operation method with fingerprint recognition according to an embodiment of the present disclosure.

As shown in FIG. 12, FIG. 12 is a flowchart of an operation method with fingerprint recognition according to an embodiment of the present disclosure. The method includes the following steps.

Step S1201: Obtain a fingerprint event that is entered by a user using a fingerprint sensor.

Further, refer to the description in step S301, and details are not described herein.

Step S1202: Present a screen-locked interface when the fingerprint event that is entered by the user does not match a preset fingerprint event, where at least one shortcut is presented on the screen-locked interface. The shortcut includes at least one of a shortcut of an application program, a shortcut of a specific function, or a shortcut of an internal element of a specific application.

When the fingerprint event that is entered by the user is a fingerprint image, that the fingerprint event that is entered by the user does not match a preset fingerprint event includes that the fingerprint image that is entered by the user is different from all pre-stored fingerprint images, or similarities are all less than a preset threshold.

When the fingerprint event that is entered by the user is a fingerprint gesture of touching the fingerprint sensor by the user, that is, at least one of a tap operation, a double tap operation, a touch and hold operation, or a sliding operation that is performed by the user on the fingerprint sensor using a specific fingerprint, that the fingerprint event that is entered by the user does not match a preset fingerprint event includes a fingerprint for touching the fingerprint sensor by the user is different from a preset fingerprint of a fingerprint gesture, or operations performed on the fingerprint sensor are different, or a similarity between operations is less than a preset threshold.

When the fingerprint event that is entered by the user is a fingerprint gesture of touching the fingerprint sensor by the user, that is, a combination of an operation instruction generated by triggering the fingerprint sensor by the user using a specific fingerprint and an operation instruction generated by triggering another operation component by the user, that the fingerprint event that is entered by the user does not match a preset fingerprint event includes a fingerprint for touching the fingerprint sensor by the user is different from a preset fingerprint of a fingerprint gesture, other operation components touched by the user are different, or operations for touching the other components by the user are different or a deviation does not fall within a preset range.

The at least one shortcut may be presented on the screen-locked interface, for example, in multiple shortcut arrangement forms in the foregoing description. Alternatively, there may be only one shortcut on the screen-locked interface, for example, an icon of a camera application.

Step S1203: Obtain a sliding direction of the user on the fingerprint sensor.

The user performs a sliding operation on the fingerprint sensor, and the terminal obtains a sliding track of the user, and determines a sliding direction of the sliding operation.

Step S1204: Determine, according to the sliding direction of the user on the fingerprint sensor, a second shortcut in the at least one shortcut presented on the screen-locked interface.

When the screen-locked interface includes multiple shortcuts, as is described in the foregoing embodiment, a sliding start point on the fingerprint sensor may be mapped to a center point of the multiple shortcuts, a shortcut in a sliding direction corresponding to the center point is determined according to the sliding direction of a sliding track obtained by the fingerprint sensor.

Figure 13:
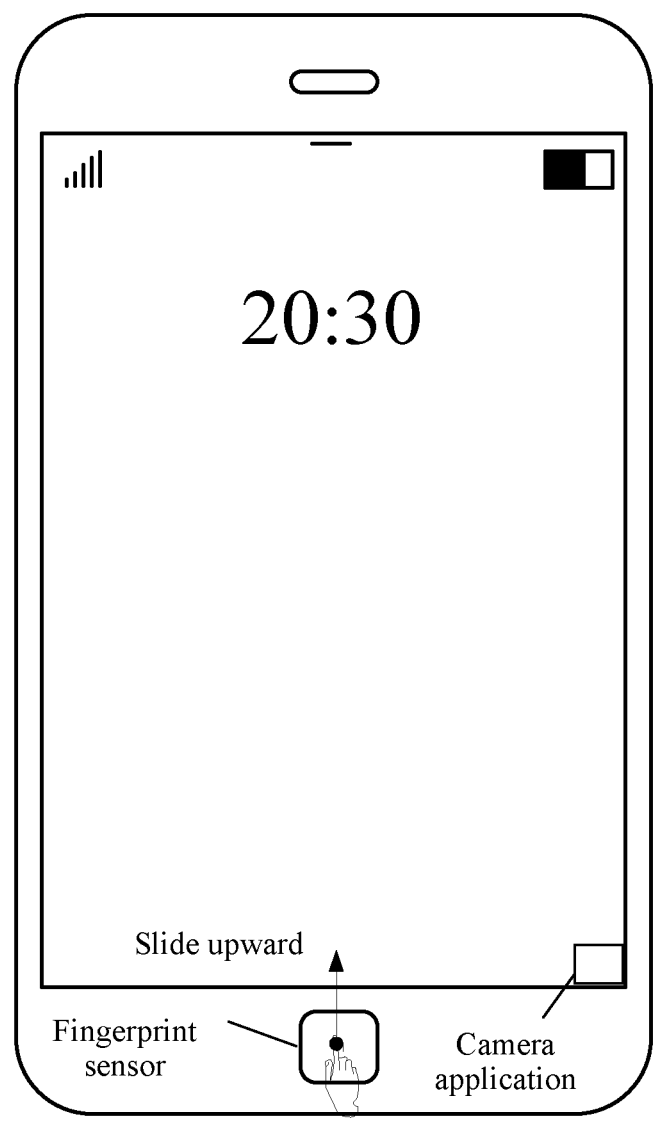
FIG. 13 is a schematic diagram of operating a mobile terminal according to an embodiment of the present disclosure.

When the screen-locked interface includes only one shortcut, the shortcut is located on an edge of a display screen, and a sliding direction is obtained by sliding towards an inner side of the display screen using the shortcut as a start point, the shortcut is run. Alternatively, when the screen-locked interface includes only one shortcut, the shortcut may be run provided that sliding of the user on the fingerprint sensor is detected. FIG. 13 is used as an example. In FIG. 13, when the fingerprint event that is entered by the user does not match the preset fingerprint event, the screen-locked interface is presented. The screen-locked interface includes a shortcut of a camera application. The camera application is presented in a lower right corner on the current display screen of the terminal. A sliding operation of the user on the fingerprint sensor is obtained. The sliding operation may be performed using any finger, or may be performed using only a preset fingerprint. When the sliding operation of the user on the fingerprint sensor is an upward sliding operation, that is, sliding is performed towards an inner side of the display screen using a shortcut on an edge of the display screen as a start point, the camera application is run, and a viewfinder in the camera application is presented. In this embodiment, a shortcut is presented on a screen-locked interface such that a user can open a corresponding shortcut by performing a sliding operation on a fingerprint sensor, and the user can quickly and conveniently run the shortcut without moving a finger to a touchscreen to perform an operation, thereby reducing operation duration, and improving operation efficiency.

Step S1205: Run the second shortcut, and present a running result.

In this embodiment of the present disclosure, fingerprint event authentication is performed, and if the authentication fails, a screen-locked interface is displayed such that security of a terminal is improved. In addition, a shortcut is presented on the screen-locked interface such that a user can open a corresponding shortcut by performing a sliding operation on a fingerprint sensor, and the user can quickly and conveniently run the shortcut without moving a finger to a touchscreen to perform an operation, thereby reducing operation duration, and improving operation efficiency.

Figure 14:
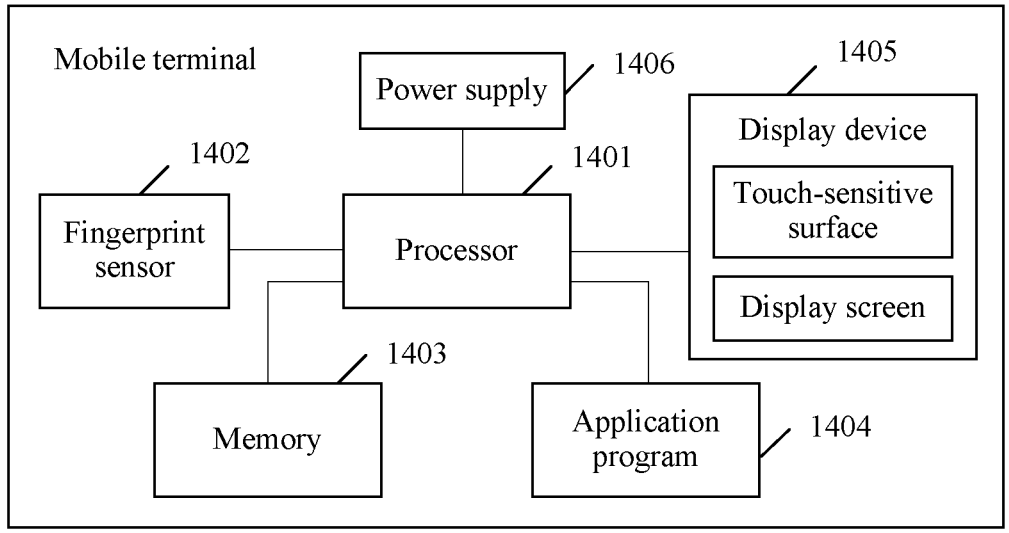
FIG. 14 is a schematic structural diagram of a mobile terminal according to an embodiment of the present disclosure.

In an embodiment of the present disclosure, as shown in FIG. 14, this embodiment of the present disclosure further provides a mobile terminal. The mobile terminal may be used to execute the method procedure in the method embodiment in FIG. 12. For a same or corresponding technical feature thereof, refer to description in the method embodiment. The mobile terminal includes a fingerprint sensor 1402 configured to obtain a fingerprint event that is entered by a user using the fingerprint sensor 1402, an display device 1405 includes a touch-sensitive surface and a display screen and configured to present a screen-locked interface if the fingerprint event that is entered by the user does not match a preset fingerprint event, where the screen-locked interface includes at least one shortcut, where the fingerprint sensor 1402 is further configured to obtain a sliding operation of the user on the fingerprint sensor, and a processor 1401 configured to determine, according to a sliding direction of the sliding operation of the user on the fingerprint sensor 1402, a second shortcut in the at least one shortcut included on the screen-locked interface, and run the first shortcut. The display device 1405 is further configured to present a running result after the processor 1401 runs the first shortcut. The mobile terminal further includes a power supply 1406 configured to supply power to the mobile terminal, and further includes a memory 1403 configured to store corresponding code or the like for the mobile terminal. Corresponding software such as an application program 1404 is further installed in the mobile terminal. The mobile terminal performs a corresponding function by invoking the corresponding software. Fingerprint event authentication is performed, and if the authentication fails, a screen-locked interface is displayed such that security of the mobile terminal is improved. In addition, a shortcut is presented on the screen-locked interface such that a user can open a corresponding shortcut by performing a sliding operation on the fingerprint sensor 1402, and the user can quickly and conveniently run the shortcut without moving a finger to a touchscreen to perform an operation, thereby reducing operation duration, and improving operation efficiency.

Figure 15:
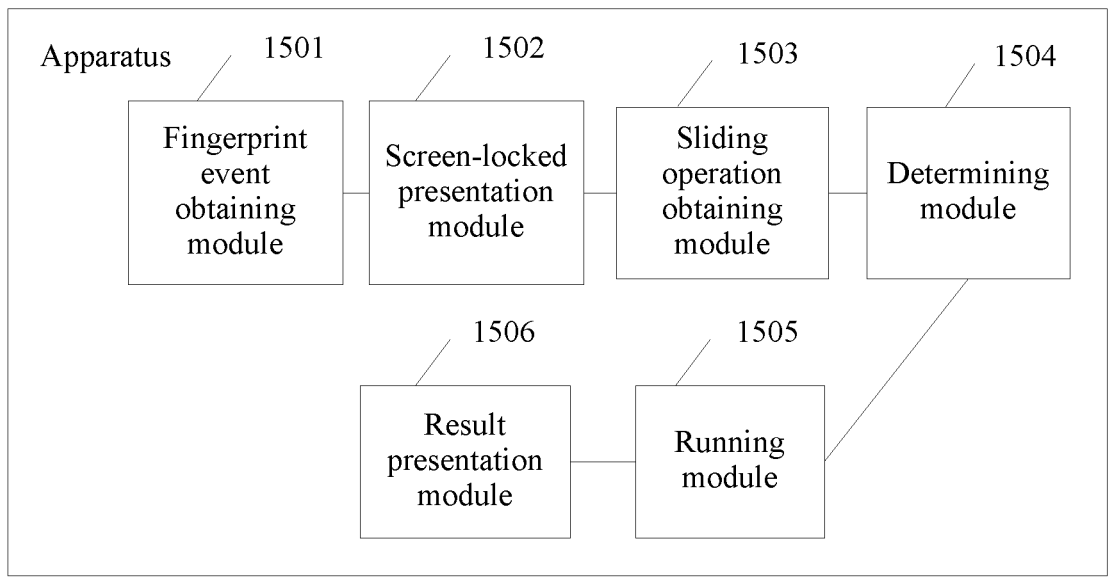
FIG. 15 is a schematic structural diagram of an apparatus according to an embodiment of the present disclosure.

In an embodiment of the present disclosure, as shown in FIG. 15, this embodiment of the present disclosure further provides an apparatus. The apparatus may be used to execute the method procedure in the method embodiment in FIG. 12. For a same or corresponding technical feature thereof, refer to description in the method embodiment. The apparatus includes a fingerprint event obtaining module 1501 configured to obtain a fingerprint event that is entered by a user, a screen-locked presentation module 1502 configured to present a screen-locked interface if the fingerprint event that is entered by the user does not match a preset fingerprint event, where the screen-locked interface includes at least one shortcut, a sliding operation obtaining module 1503 configured to obtain a sliding operation of the user on the fingerprint sensor, a determining module 1504 configured to determine, according to a sliding direction of the sliding operation of the user on the fingerprint sensor, a first shortcut in the at least one shortcut included on the screen-locked interface, a running module 1505 configured to run the first shortcut, and a result presentation module 0506 configured to present a running result after the running module 1505 runs the first shortcut.

In all the implementations of the present disclosure, when a biological feature recognizer such as an iris recognizer or a retina recognizer other than a fingerprint sensor is further installed in a mobile terminal, the terminal may execute solutions described in the embodiments of the present disclosure using the biological feature recognizer. The following uses iris recognition as an example. An iris recognizer is disposed in the terminal in which a pre-stored iris parameter is locally configured. When a user performs an operation, the terminal obtains an iris feature of the user using the iris recognizer, and matches the iris feature with the pre-stored iris parameter. When matching succeeds, a display screen of the terminal may present an interface shown in FIG. 5. The terminal collects a movement of an eyeball of the user or a movement of a line of sight using the iris recognizer, a camera, or an eyeball recognizer, and converts the movement into an event that can be recognized by the terminal. For example, when determining, by means of collection, that the eyeball of the user moves upward, the terminal recognizes the movement as a sliding event that is performed on the touchscreen in an upward operation vector direction using a center point of shortcuts as a center.

It should be noted that, in the embodiments of the present disclosure, descriptions such as "first" and "second" are used only to distinguish between described objects, and do not have actual meanings. For example, meanings such as a portable electronic device and a terminal.

Functional modules in the embodiments of the present disclosure may be integrated into one processing unit module, or each of the modules may exist alone physically, or two or more modules are integrated into one module. The integrated module may be implemented in a form of hardware, or may be implemented in a form of hardware in addition to a software functional unit.

It may be clearly understood by persons skilled in the art that, for the purpose of convenient and brief description, division of the function modules is used as an example for description. In actual application, the foregoing functions can be allocated to different function modules and implemented according to a requirement, that is, an inner structure of an apparatus is divided into different function modules to implement all or some of the functions described above. For a detailed working process of the apparatus, refer to a corresponding process in the method embodiment. Implementation principles and technical effects of the apparatus are similar, and a same or corresponding technical feature is not described herein again.

Finally, it should be noted that the embodiments are only intended for describing the technical solutions of the present disclosure, but not for limiting the present disclosure. Although the present disclosure is described in detail with reference to the embodiments, persons of ordinary skill in the art should understand that they may still make modifications to the technical solutions described in the embodiments or make equivalent replacements to some or all technical features thereof, without departing from the scope of the technical solutions of the embodiments of the present disclosure.

What is claimed is:

1. A method for a mobile terminal, comprising:
receiving a first fingerprint event from a user at a preset position of the mobile terminal;
displaying on a display screen of the mobile terminal a first plurality of shortcuts when the first fingerprint event matches a stored fingerprint event;
detecting a first sliding gesture input from the user, the first sliding gesture starting at the preset position receiving the first fingerprint event and extending from the preset position to select a first shortcut of the first plurality of shortcuts; and
running the first shortcut in response to the detecting of the first sliding gesture.

2. The method of claim 1, wherein at least one of the first plurality of shortcuts comprises a link of an element of an application.

3. The method of claim 1, wherein the preset position is located on a touchscreen of the mobile terminal and the mobile terminal is in a screen-off state prior to the first fingerprint event, the method further comprising:
illuminating the mobile terminal display screen in response to the first fingerprint event.

4. The method of claim 1, wherein the preset position is located on a physical input device on the mobile terminal and the mobile terminal is in a screen-off state prior to the first fingerprint event, the method further comprising:
illuminating the mobile terminal display screen in response to the first fingerprint event.

5. The method of claim 1, wherein displaying on the display screen of the mobile terminal the first plurality of shortcuts comprises any one of the following:
displaying the first plurality of shortcuts in a preset region on a first interface according to a preset arrangement rule; or displaying the first plurality of shortcuts in a preset region on a second interface according to a preset arrangement rule after a first interface is switched to a second interface; or displaying the first plurality of shortcuts on a suspend interface which is displayed on a first interface according to a preset arrangement rule; or displaying the first plurality of shortcuts according to whether the user operates the mobile terminal by using a left hand or a right hand.

6. The method of claim 1, further comprising:

displaying on the display screen of the mobile terminal a screen-locked interface when the first fingerprint event does not match the first preset fingerprint event, and displaying on the screen-locked interface a second plurality of shortcuts.

7. The method of claim 1, wherein detecting a first sliding gesture input comprises detecting physical input from first fingerprint event at the preset position of the mobile terminal and extending in a direction away from the preset position.

8. The method of claim 1, wherein the fingerprint event comprises receiving fingerprint input at a fingerprint sensor, and an operation performed on the fingerprint sensor.

9. The method of claim 1, wherein the fingerprint event comprises receiving fingerprint input at a fingerprint sensor and the first sliding gesture originating at the fingerprint sensor.

10. The method of claim 1, wherein the fingerprint event comprises receiving fingerprint input at a fingerprint sensor that is collocated with the preset position of the mobile terminal, the fingerprint event comprising receiving fingerprint input at the fingerprint sensor and an operation performed on another component of the mobile terminal.

11. The method according to claim 1, wherein the display screen and the touchscreen are integrated into a single display.

12. A mobile terminal, comprising:
a display screen;
a memory; and
a processor coupled to the touchscreen and the memory, wherein the memory comprises instructions that, when executed by the processor, cause the mobile terminal to perform:
receiving a first fingerprint event from a user at a preset position of the mobile terminal;
displaying on the display screen a first plurality of shortcuts when the first fingerprint event matches a stored fingerprint event;
detecting a first sliding gesture input from the user, the first sliding gesture starting at the preset position receiving the first fingerprint event and extending from the preset position to select a first shortcut of the first plurality of shortcuts; and
running the first shortcut in response to the detecting of the first sliding gesture.

13. The mobile terminal of claim 12, wherein at least one of the first plurality of shortcuts comprises a link of an element of an application.

14. The mobile terminal of claim 12, wherein the preset position is located on a touchscreen of the mobile terminal and the mobile terminal is in a screen-off state prior to the first fingerprint event, the instructions further causing the mobile terminal to
illuminate the display screen in response to the first fingerprint event.

15. The mobile terminal of claim 12, wherein the preset position is located on a physical input device on the mobile terminal and the mobile terminal is in a screen-off state prior to the first fingerprint event, the instructions further causing the mobile terminal to
illuminate the display screen in response to the first fingerprint event.

16. The mobile terminal of claim 12, wherein execution of the instructions by the processor that cause the mobile terminal to display on the display screen the first plurality of shortcuts cause the mobile terminal to perform any one of the following:
display the first plurality of shortcuts in a preset region on a first interface according to a preset arrangement rule; or
display the first plurality of shortcuts in a preset region on a second interface according to a preset arrangement rule after a first interface is switched to a second interface; or
display the first plurality of shortcuts on a suspend interface which is displayed on a first interface according to a preset arrangement rule; or
display the first plurality of shortcuts according to whether the user operates the mobile terminal by using a left hand or a right hand.

17. The mobile terminal of claim 12, wherein execution of the instructions by the processor further causes the mobile terminal to:
display a screen-locked interface when the first fingerprint event does not match the first stored fingerprint event; and
display a second plurality of shortcuts on the screen-locked interface.

18. The mobile terminal of claim 12, wherein detecting the first sliding gesture input comprises detecting physical input from the user at the preset position of the mobile terminal and extending in a direction away from the preset position.

19. The mobile terminal of claim 12, wherein the fingerprint event comprises receiving fingerprint input at a fingerprint sensor and an operation performed on the fingerprint sensor.

20. The mobile terminal of claim 12, wherein the fingerprint event comprises receiving fingerprint input at the fingerprint sensor and the first sliding gesture originating at the fingerprint sensor.

21. The mobile terminal of claim 12, wherein the fingerprint sensor is collocated with the preset position of the mobile terminal and the fingerprint event comprises receiving fingerprint input at the fingerprint sensor of the mobile terminal and an operation performed on another component.

22. The mobile terminal of claim 12, wherein the display screen and the touchscreen are integrated into a single display.

23. A computer program product comprising a non-transitory computer readable storage medium including computer-executable instructions that, when executed by a processor, cause a mobile terminal to perform:
receiving at a preset position of the mobile terminal a first fingerprint event from a user;
displaying on a display screen of the mobile terminal a first plurality of shortcuts when the first fingerprint event matches a stored fingerprint event;
detecting a first sliding gesture input from the user, the first sliding gesture starting at the preset position and extending from the preset position to select a first shortcut of the first plurality of shortcuts; and
running the first shortcut in response to the detecting of the first sliding gesture.

24. The computer program product of claim 23, wherein the fingerprint event comprises receiving fingerprint input at a fingerprint sensor of the mobile terminal and performing an operation on the fingerprint sensor.

* * * * *